United States Patent [19]

Pollart et al.

[11] Patent Number: 5,410,135
[45] Date of Patent: Apr. 25, 1995

[54] SELF LIMITING MICROWAVE HEATERS

[75] Inventors: Kenneth A. Pollart, Mason, Ohio; Charles C. Habeger, Jr., Appleton, Wis.

[73] Assignee: James River Paper Company, Inc., Milford, Ohio

[21] Appl. No.: 64,582

[22] Filed: May 21, 1993

Related U.S. Application Data

[60] Continuation-in-part of Ser. No. 602,219, Oct. 23, 1990, abandoned, which is a division of Ser. No. 239,544, Sep. 1, 1988, Pat. No. 5,002,826.

[51] Int. Cl.⁶ .............................................. H05B 6/80
[52] U.S. Cl. .................................. 219/730; 219/759; 426/234; 426/243
[58] Field of Search ................ 219/730, 759; 426/107, 426/241, 234, 243; 99/DIG. 14

[56] References Cited

U.S. PATENT DOCUMENTS

| | | |
|---|---|---|
| 4,864,089 | 9/1989 | Tighe et al. |
| 4,866,232 | 9/1989 | Stong ................................ 219/730 |
| 4,917,848 | 4/1990 | Kurita et al. ...................... 264/184 |
| 5,022,826 | 3/1991 | Pollart et al. ..................... 219/730 |
| 5,132,144 | 7/1992 | Parks . |

FOREIGN PATENT DOCUMENTS

0466361A1 1/1992 European Pat. Off. .
WO93/04516 5/1990 WIPO .

OTHER PUBLICATIONS

Oct. 3, 1994 International Search Report in PCT/US94/04968.
Benguigui et al., On the Percolative Behavior of Carbon Black Cross-Linked Polyethylene Systems, J. Poly. Sc: Part B: Polymer Physics, vol. 25, pp. 127–135 (1987).
Sumita et al., Dispersion of Fillers and the Electrical Conductivity of Polymer Blends Filled with Carbon Black, Polymer Bulletin vol. 25, No. 1, Jan. 1991, pp. 265–273.
Brodeur et al., Phase Change Materials for Thermal Stabilization of Composite Thermistors, J. of Materials Research, vol. 6, No. 1, Jan. 1991. pp. 175–182.
Voet, Temperature Effect of Electrical Resistivity of Carbon Black Filled Polymers, Rubber Chemistry and Technology, vol. 54 No. 1, Mar.–Apr. 1981 ISSN 0035-9475, pp. 43–50.
Sherman et al., Electron Transport Processes in Conductor-Filled Polymers, Polymer Engineering and Science, vol. 23, No. 1, Jan. 1983, pp. 36–46.
Sumita et al., Effect of Melt Viscosity and Surface Tension of Polymers on the Percolation Threshold of Conductive-Particle-Filled Polymeric Composites, J. Macromol. Sci.–Phys., vol. B25 Nos. 1 & 2, 1986, pp. 171–184.
Kirkpatrick, Percolation and Conduction, Reviews of Modern Physics, vol. 45, No. 1, Oct. 1973, pp. 574–588.
Narkis et al., Electrical Properties of Carbon Black Filled Polyethylene, Polymer Engineering and Science, vol. 18, No. 8, Jun. 1978, pp. 649–653.
Sichel et al., Tunneling Conduction in Carbon-Polymer Composites, Marcel Decker, Inc., 1982, pp. 51–77.
Beuche, A New Class of Switching Materials, J. of Applied Physics, vol. 44 No. 1, Jan. 1973, pp. 532–533.
Nakkis et al., Electrical Properties of Carbon Black Filled Crosslinked Polyethylene, Polymer Engineering and Science, vol. 21, No. 18, Nov. 1981, pp. 1049–1054.

*Primary Examiner*—Philip H. Leung
*Attorney, Agent, or Firm*—Finnegan, Henderson, Farabow, Garrett & Dunner

[57] ABSTRACT

A self-limiting dispersion of a conductive material in a binder is disclosed wherein the conductive material consists essentially of a carbon material having a structure selected to undergo percolation when dispersed in the binder at a concentration of from about 10 weight percent to about 45 weight percent. The binder comprises a thermoplastic material selected to go through a first order phase transition or a second order transition at a temperature from about 300° F. to about 480° F. and the dispersion is formulated near the conductance percolation threshold so that its electrical conductivity drops precipitously (e.g., at least about 1.5 orders of magnitude) above the binder transition temperature. The dispersion of the conductive material in the binder is especially suitable for use as a self-limiting microwave heater material which is either a molding composition, or surface coating composition, and especially a composition that can be applied to a substrate by printing.

52 Claims, 14 Drawing Sheets

SELF LIMITING MICROWAVE HEATERS

CROSS REFERENCE TO RELATED APPLICATIONS

The present application is a continuation-in-part of U.S. patent application Ser. No. 07/602,219 filed Oct. 23, 1990, now abandoned, which is a divisional of U.S. patent application Ser. No. 07/239,544 filed Sep. 1, 1988, now U.S. Pat. No. 5,002,826.

BACKGROUND OF THE INVENTION

Field of Invention

The present invention is subject to a wide range of applications, but is especially suited for use as a self-limiting microwave heater. The present application describes compositions and processes for manufacturing such heater. The present invention will be particularly described in that connection.

Discussion of Related Art

The cooking of food and heating of substances with microwave radiation has become increasingly popular and important in recent years because of its speed, economy, and low power consumption. With food products, however, microwave heating has drawbacks. One of the major drawbacks is the inability to brown or sear the food product to make it similar in taste and appearance to conventionally cooked food.

Several methods have been attempted in the prior art to overcome the browning problem. One such method for browning food and other materials involves the use of a metallized coating on paperboard. The prior art process for manufacturing this coated paperboard required several steps.

First, metal particles are vacuum deposited onto a film, preferably an oriented polyester film. The film is then laminated onto the paper. The metallized film/paper laminate, typically, must be positioned onto a particular part of the food package, requiring a relatively complicated windowing operation. The windowing operation requires that the metallized laminate be slit before entering the process. The windowing process also can only create rectangular shaped laminates.

Besides the complexity of the prior art process, there are several other disadvantages. With vacuum deposition, it is difficult, if not impractical, to develop a specific pattern or shape to the coating applied which would be useful for controlling the heating of the food product. It is also difficult to vary the coating formulation or coating thickness in localized areas of the film to meet different heating requirements. This is particularly important when heating different foods together in a microwave oven.

In many microwave applications, an additional heating response is needed to crisp the surface of the food, e.g., pizza crust, waffles, french fries and the like, or a faster heat-up rate and higher temperature are needed for acceptable product quality, such as for popcorn. While the additional heat input is essential for these applications, at the same time it is desirable that this microwave interactive material or "susceptor" should possess the ability to "limit" its upper temperature range to avoid the potential for scorching (or burning) the substrate on which the microwave interactive material is placed, such as paper, paperboard package material, thermoplastic films and the like. The potential for scorching or burning the food itself which is positioned on the substrate is also a problem.

Tighe et al., U.S. Pat. No. 4,876,423, describes a method for controlling the heating response in a microwave interactive coating by combining certain select metal particles and conductive particles. Tighe et al. note that the combination of aluminum particles and carbon black or a combination of aluminum particles and conductive particles such as titanium carbide or zinc oxide were found to improve control over the degree of heating. Tighe et al. employed heat resistant thermoplastic resins as the materials of choice for the binder to keep the metal particles and conductive particles from overheating and theorized that as the resin glass transition temperature ($T_g$) was reached, the binder expanded so that at some point metal particle to metal particle contact was lost thereby preventing further heating until the binder cooled down and contracted, thereby making the particles contiguous again. Tighe et al., column 6, lines 40-62.

Tighe et al., U.S. Pat. No. 4,959,516 by contrast illustrates in Example 13, that carbon black alone in combination with a polyether sulfone resinous binder did not function as a self-limiting microwave susceptor coating in that high temperatures were achieved very quickly and dangers of thermal runaway became evident e.g. smoke and fire. By contrast, when aluminum flake was used in the coating, a non-metallic object (a ceramic plate) was heated to 490° F. in four minutes and plateaued at 500° F.

Harrison, U.S. Pat. No. 4,917,848 describes a method for producing a microwave interactive sheet material for use in microwave cooking by providing a receiving sheet and applying to the sheet a composition consisting of a liquid component containing a suspension of microwave interactive particles which are not greater than 50% of the composition so as to distribute the composition over the surface of the receiving sheet. This is followed by drying the composition to leave the particles distributed and to fix the particles in such distribution so as to ensure that they form a layer which is susceptible to microwave radiation.

These coatings are an example of a microwave interactive coating that is not self-limiting. To prevent runaway heating, one must control the coating weight or interactive particle content so that the composition will simply equilibrate with its surroundings.

Stone, U.S. Pat. No. 4,866,232, describes a food package for heating or cooking a food product inside of the packages by microwave heating. Microwave susceptible areas are applied to the food packets by a printing process, the ink used in this printing process comprising metal particles suspended in an ink-like substance.

SUMMARY OF THE INVENTION

Accordingly, the present invention is directed to a novel self-limiting microwave heater and a composition and a process for manufacturing such a heater that substantially overcomes one or more of the limitations and disadvantages of the related art.

These specific objects and other objects and advantages of the present invention will be realized and attained by the article of manufacture, composition of matter and process particularly pointed out in the written description and claims hereof as well as the appended drawings.

To achieve these and other objects and advantages and in accordance with the purpose of the invention, as embodied and broadly described herein, the invention comprises a self-limiting dispersion of a conductive material in a binder where said conductive material consists essentially of a carbon material having a structure selected to have a percolation threshold when dispersed in said binder at a concentration of from about 10 weight percent to about 45 weight percent in said binder, said binder comprising a thermoplastic material selected to go through a first order phase transition or a second order phase transition at a temperature from about 200° F. to about 480° F. said dispersion being near the percolation threshold so that its electrical conductivity drops at least from about 1.5 to about 2 orders of magnitude when above the binder phase transition temperature.

The invention is based on the discovery of a self-limiting dispersion of a conductive material in a binder where the conductive material is a carbon material having a structure selected to undergo percolation when dispersed in the binder at a concentration of from about 10 weight % to about 45 weight %. It has been discovered the binder that can be utilized in this respect comprises a thermoplastic material selected to go through a first order phase transition or a second order phase transition at a temperature from about 200° F. to about 480° F., especially when exposed to microwave radiation. Above these temperatures the dispersion is below the conductance percolation threshold.

The heater substantially maintains the self-limiting temperature when irradiated with microwave radiation of from about 4 to about 16 Watts/cm$^2$ or higher.

In another aspect, the invention employs conductive carbon black or graphite as the conductive material wherein the binder is a polycarbonate, a polyvinylidene fluoride, methylpentene copolymer, polyvinyl alcohol or a cellulose ester.

The present invention also provides a microwave interactive coating which is capable of being printed on a substrate. This coating overcomes the problems inherent in vacuum deposited metal coatings because the coatings can be printed exactly where they are required. Furthermore, coating patterns, coating formulations and coating thicknesses can all be varied using conventional printing processes. A printing process also allows the use of materials besides vacuum deposited metals as microwave reactive materials, as well as providing the possibility for a wide range of heating temperatures and a wide variety of applications.

Compositions that meet the desired parameters can also be extruded as a film and used to form the total packets or used as patches applied to other packages. The extruded compositions can be thermoformed into trays or cups which would be microwave interactive and temperature limiting. The compositions can also be molded in conventional molding processes such as by injection molding.

It is to be understood that both the foregoing general description and the following detailed description are exemplary and explanatory and are intended to provide further explanation of the invention as claimed.

The accompanying drawings, are intended to provide a further understanding of the invention and illustrate several embodiments of the invention and together with the written description serve to explain some of the principles of the invention.

BRIEF DESCRIPTION OF THE DRAWINGS

Specifically, FIG. 1 shows the results obtained employing GE 4701 polycarbonate/BP-160 at a coating weight of 9 pounds per 3,000 square feet; FIG. 2 shows the results obtained using Kynar ® /BP-160 at a coating weight of about 3 pounds per 3,000 square feet; FIG. 3A shows the results obtained using a high temperature polycarbonate/BP-160 in a 60/40 ratio employing 139 watts initial power; FIG. 3B shows a plot in which 139 watts of initial power were used; FIGS. 4A and 4B were plotted at 319 watts initial power; FIGS. 5A and 5B were plotted employing 385 watts initial power; FIG. 6 shows the results obtained using Lexan ® 4701/Black Pearls ® 160; FIG. 7 shows the results obtained using Lexan ® 4701/Arosperse ® 15; FIG. 8 shows the results obtained using Lexan ® 4701/Vulcan ® XC-72; FIG. 9 shows the results using Lexan ® 4701/Black Pearls ® 1100; FIG. 10A shows Gerling data for 75/25 Lexan ® 4701/Vulcan ® XC-72 coating at 135 watts incident power where 135 watts initial power was employed; FIG. 10B shows the results where 135 watts initial power was used; FIG. 11A shows Gerling data for 75/25 Lexan ® 4701/Vulcan ® XC-72 at 291 watts incident power and 291 watts initial power; FIG. 11B shows the results where 291 watts initial power was employed; FIG. 12 shows the results obtained using TPX DX (T.M.) 820/Black Pearls ® 160; FIG. 13 shows the results obtained employing Tenite ® propionate 377 E/Black Pearls ® 160; FIG. 14 shows the results obtained using Lexan ® 4701/aluminum flake/Black Pearls ® 160.

DETAILED DESCRIPTION

Figure 1:
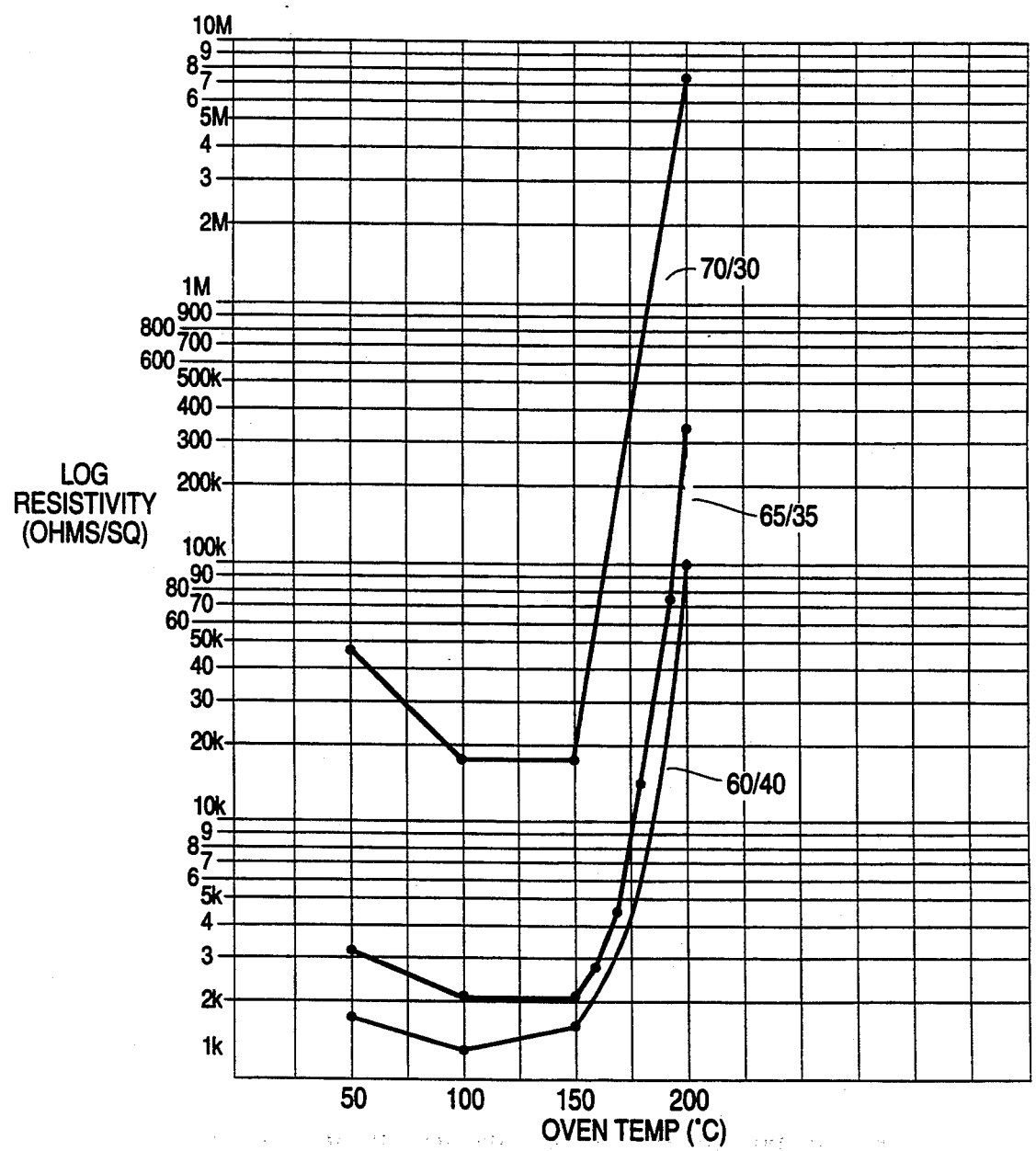
FIGS. 1, 2, 6–9 and 12–14 are graphs which plot the change in resistivity against temperature in a conventional oven for a carbon black conductive material in combination with a resin binder at various pigment-:binder ratios.
Figure 2:
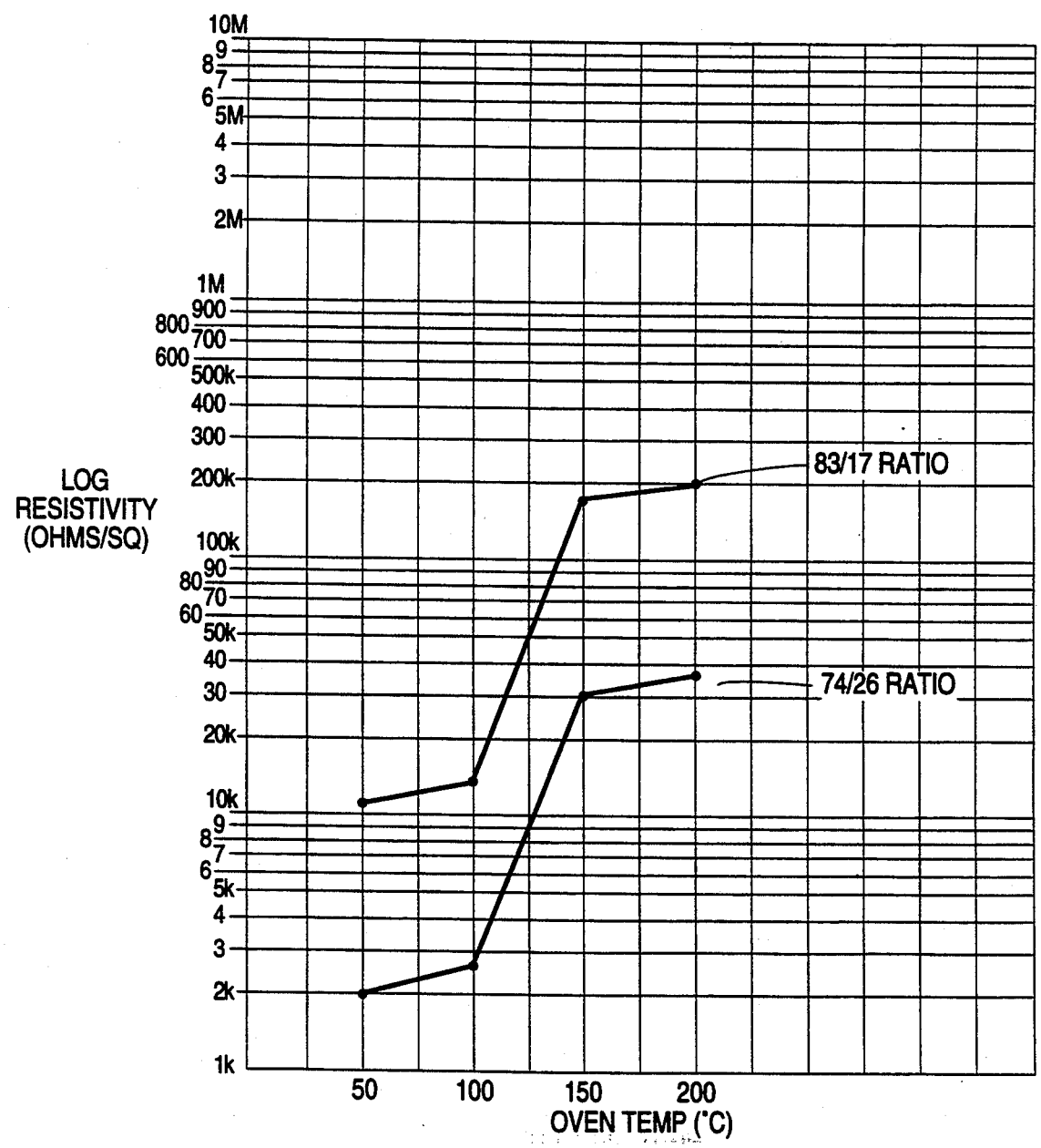
Figure 3A:
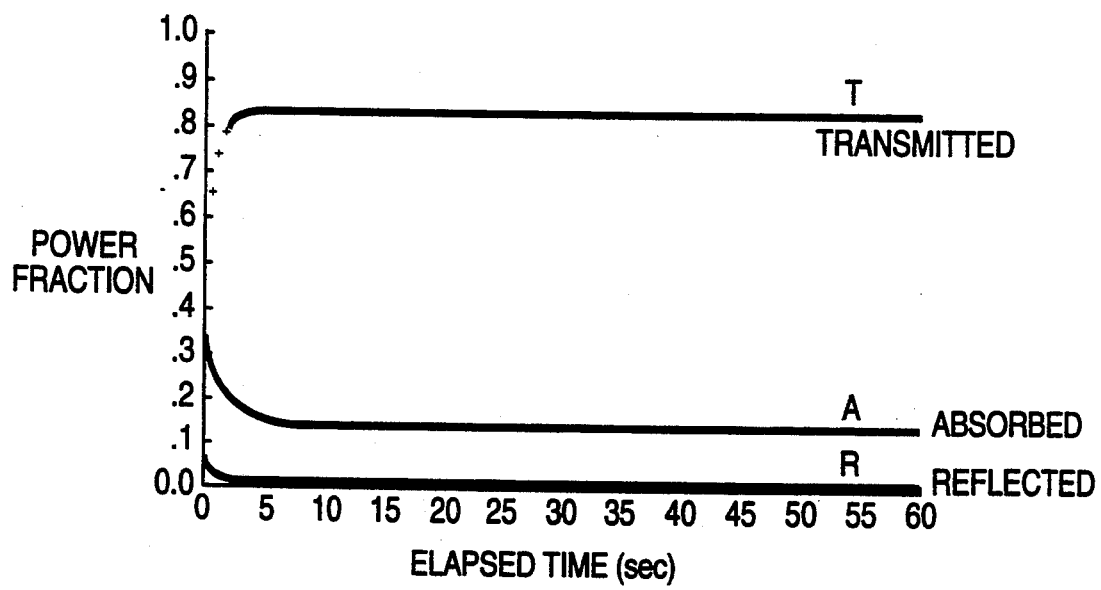
FIGS. 3A, 3B, 4A, 4B, 5A, 5B and 10A, 10B, 11A, 11B are plots of power fraction versus time, and temperature versus time at different wattages of a self-limiting microwave heater irradiated with a Gerling microwave apparatus.
Figure 3B:
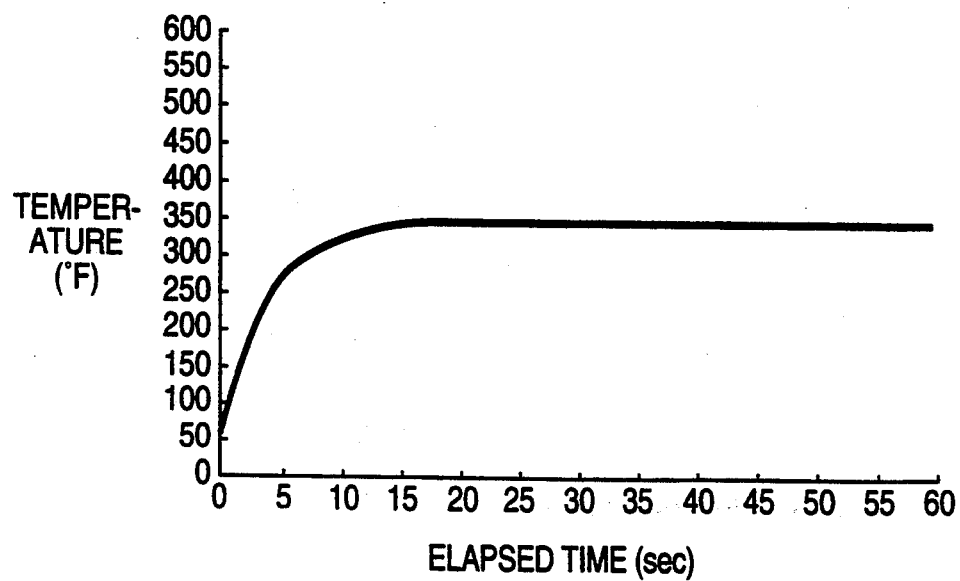
Figure 4A:
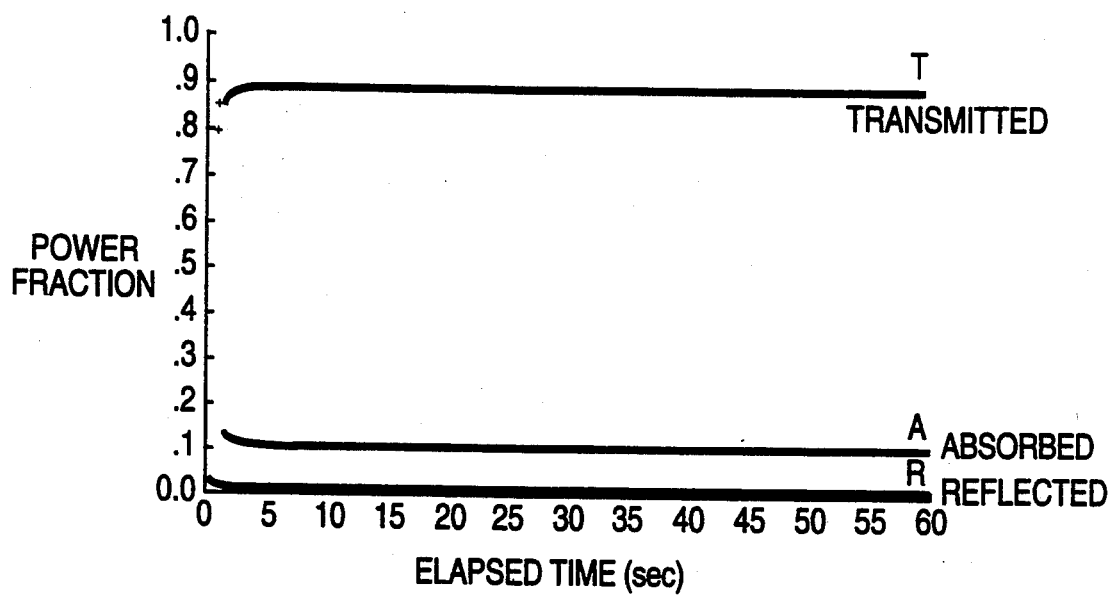
Figure 4B:
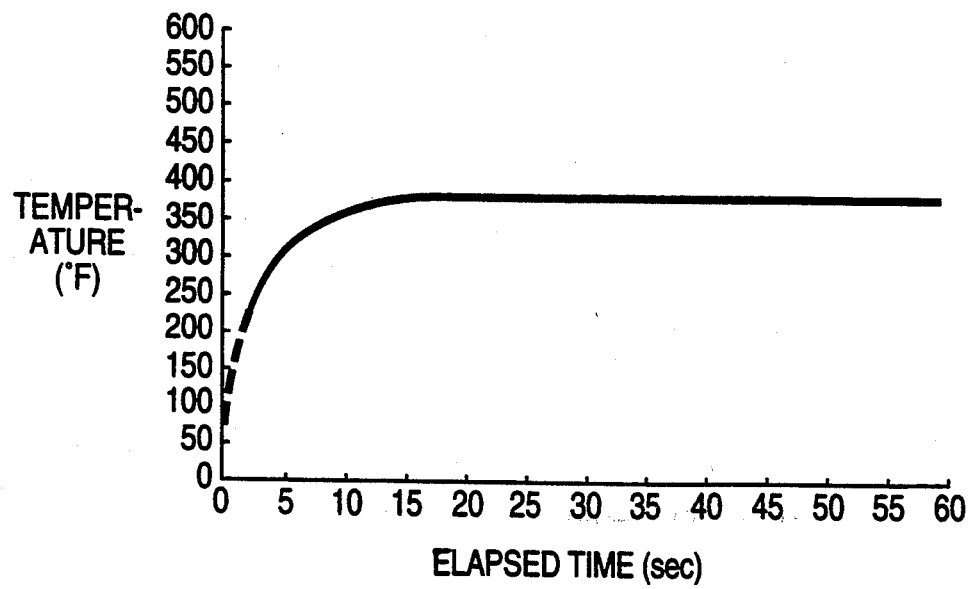
Figure 5A:
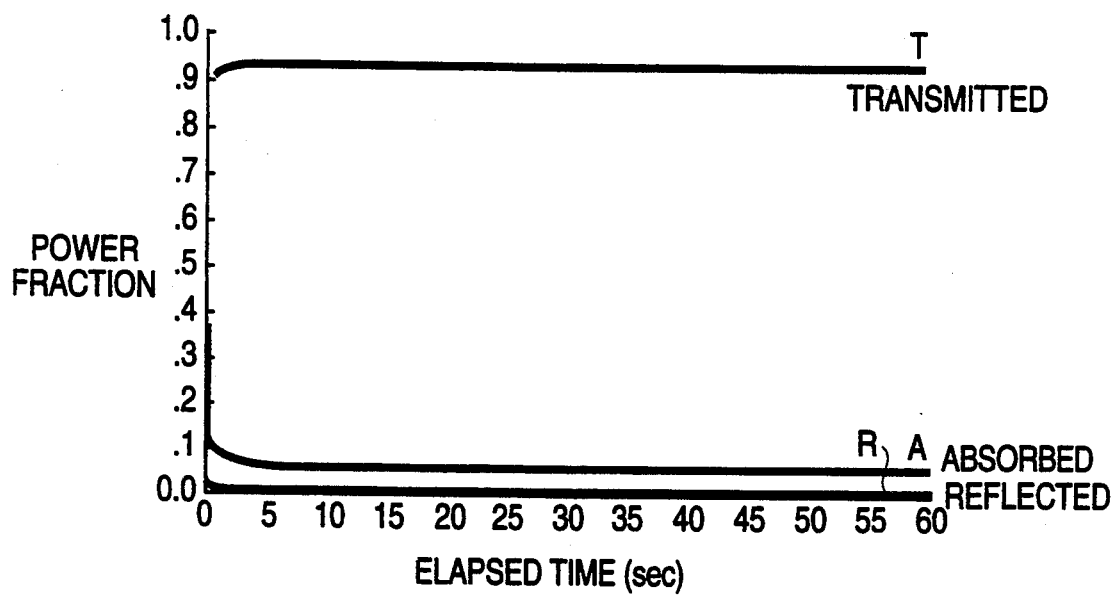
Figure 5B:
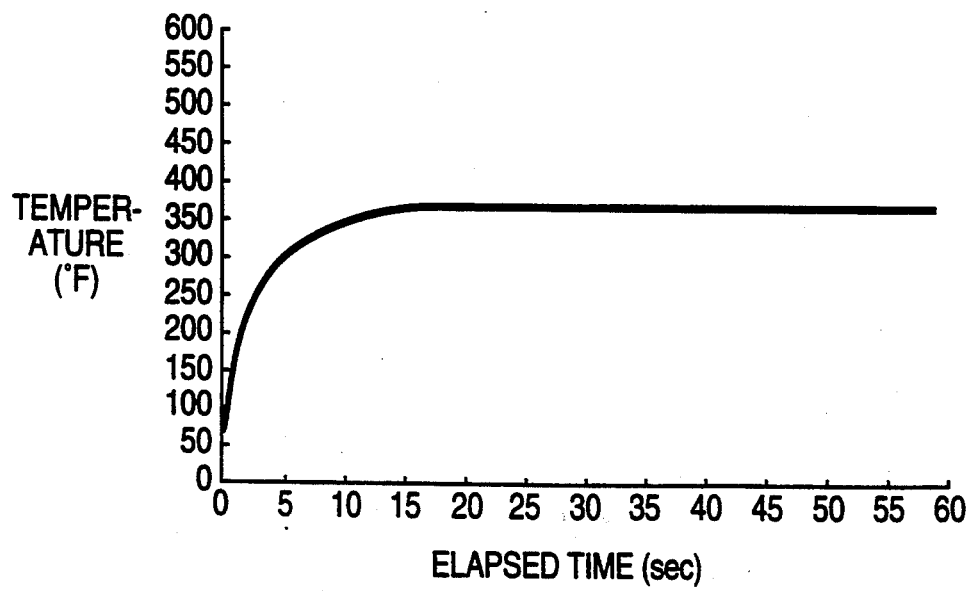

Microwave reactive materials (MRM) are capable of converting microwave energy to heat. This is accomplished through the electrical conductivity of the microwave reactive materials. The materials having these properties will hereafter be referred to as a conductive material(s), microwave reactive material(s) or material(s).

The microwave reactive materials included within the scope of this invention include any material which has suitable conductive properties so that a thin layer of material is capable of converting significant microwave radiation to heat energy. Furthermore, the microwave reactive material can have different properties depending upon the formulation, the type of binder used, or the microwave reactive material's particle size and shape. The properties of the substrate on which the material is laminated, printed or coated, such as the orientation, heat set temperature, and melting point or glass transition temperature (where the substrate is a thermoplastic material), as well as the adhesion between the coating and the substrate will affect the reactiveness of the materials to microwave energy.

The type and amount of microwave reactive materials used in the coating composition generally determines the degree of interaction with the microwaves and hence the amount of heating. In a preferred embodiment, where the material used is conductive as defined herein, the amount of heat generated is a function of the surface conductivity which is the product of the bulk conductivity of the material and the thickness of the material.

Since one aspect of the present invention comprises self-limiting microwave heaters, not only the type and the amount of microwave reactive materials have to be considered but also the type and amount of polymeric materials that the microwave reactive materials are incorporated in i.e., the polymer matrix. The design of coatings, films or extruded materials that exhibit the necessary properties to obtain the self-limiting microwave heaters of the present invention takes into account the fact that conductive microwave heaters function because of their electrical conductivity which is attributable to the microwave reactive material contained in the polymer matrix. Most polymers are moderately good electrical insulators having bulk conductivities generally less than about $10^{12}$/ohm-cm whereas a microwave reactive material such as graphite has a bulk conductivity in the plane of the stacked aromatic ring structure common to graphite of about $10^5$/ohm-cm and about $10-10^2$/ohm-cm normal to the plane. Carbon black particles which are aciniform or grape-cluster-aggregates of submicron-sized graphite-like spheroids are also fairly good conductors.

As can be appreciated from the foregoing, there is a difference in bulk conductivity between graphite or carbon black and most polymeric materials. A combination of microwave reactive materials and polymer therefore would result in a material of intermediate conductivity and generally, the conductivity of a blend of a good and a poor conductor will be a function of their relative concentrations. A small number of highly-conductive disconnected microwave reactive particles in a polymer matrix would have a very minor influence on conductivity. An electric field applied to the combination remains concentrated in the regions between the particles and little current flows between them. At higher concentrations of particles, however, the particles begin to touch and coalesce into connected structures. At this point, charge carriers can migrate between the electrodes without leaving the conductive phase, and the electric field cannot concentrate in the polymer matrix. The conductor volume concentration (i.e., the concentration of microwave reactive particles) at which an idealized, infinite conductive structure forms is called the percolation threshold. Well below the percolation threshold, a combination of particles and polymer matrix is an insulator; above percolation it is a conductor; and near percolation, the conductivity is extremely sensitive to concentration. For randomly distributed, spherical carbon particles, percolation would occur at about a 30 wt. % concentration.

The actual percolation threshold for carbon black composites, however, is very dependent on the type of carbon. For Ketjenblack TM, an aciniform or highly-aggregated, linear, porous particle structure of carbon black, percolation is around 3 wt. % while for thermal black (a poorly aggregated, solid structure) it is over 20 wt. %. These phenomenon might be explained by the non-random distribution of the non-spherical black particles and the fact that carbon particles with high aspect ratios connect up at lower concentrations.

The concentration of the conductive materials such as carbon at which percolation takes place is an important consideration in the design of self-limiting heaters and especially self-limiting microwave heaters. Even though percolation will occur with some carbon black materials at about 3%, the conductivity (i.e., the reciprocal of resistivity) at the percolation threshold is rather low as compared to carbon materials that percolate at about 20 wt. or about 30 wt. %. The latter type carbon black materials at the higher concentrations are preferred for the self-limiting heaters of the present invention and especially the self-limiting microwave heaters of the present invention since higher conductivities at percolation will allow a practical microwave heating element to achieve large microwave absorption ratios at a reasonable thickness. Microwave heating is a phenomenon based on surface conductivity, i.e., up to a surface conductivity of about 0.005/ohms, more highly conductive materials generate more heat when exposed to microwave radiation.

This is, however, only part of the explanation. The other phenomenon that must be taken into account is the semi-crystalline structure of a typical polymer binder or matrix as well as the thermal transitions of the polymer. These thermal transitions comprise a first order phase transition which is the glass transition of the polymer. A second order phase transition occurs at the melt temperature of the polymer. At the first order phase transition or the second order phase transition, the polymer will undergo an increase in volume or exhibit a thermal expansion.

Particulate microwave reactive material particles tend to congregate in the amorphous regions of semi-crystalline polymers, which, although the crystallinity can be quite high, form connected pathways around the crystallites. Since the particles are excluded from the crystalline regions, they can percolate in the pathways at a low overall concentration. Accordingly, the percolation thresholds of microwave reactive materials in combination with polymers are highly dependent on the properties of each.

In addition to percolation, quantum mechanical tunneling plays a major role in the standard description of microwave reactive material-polymer conduction. Even above percolation, the particles do not exactly touch. They are separated by thin layers of polymer which provide potential barriers for the charge carriers (i.e. electrons or holes). The carriers do not have enough energy to surmount the barriers and they are not able to hop from particle to particle. Nonetheless, since the barriers are very thin, significant charge transfer can occur through the tunnelling mechanism. It is believed, therefore, that composites of microwave reactive material particles in a polymer matrix comprise a connected network of particles separated by very thin polymeric layers.

At room temperature and above, the tunnelling current between the particles is extremely dependent on particle separation. Temperature variations, which may cause relatively small changes in particle separation, can therefore have disproportionate influences on conductance. The polymer matrix generally has a higher coefficient of thermal expansion than the particle, and a rising temperature tends to wedge the islands apart. The tunnelling current is very sensitive to insulator thickness, and large conductivity changes can result from small polymer expansions. If in addition, the particle concentration is near percolation, where conductance is exceptionally responsive to structural change, the conductance decreases with temperature can be particularly dramatic. Near the thermal transition of the polymeric binder, where the thermal coefficient of expansion is large, huge thermal coefficients of conductivity are exhibited in near-percolation-threshold mixtures.

Both first and second order transitions of a polymeric binder can induce orders of magnitude conductivity changes in a near-percolation composite and both are utilized here for microwave temperature control. Semi-crystalline polymers, whose first order transition temperature ($T_g$) is below room temperature, can control through an above room temperature second order transition temperature, i.e. the melt temperature ($T_m$). As temperature of a composite with a semi-crystalline binder passes through a second order transition at $T_m$ the crystallites regions "melt", i.e. they change from crystalline phase to amorphous phase. At the transition the thermal expansion coefficient undergoes a discontinuity. If the conductive phase is near percolation, this can produce a very large decrease in conductivity over a narrow temperature range. For microwave thermostable operation, an ideal binder would be volumetrically constant below $T_m$, but would display a large expansion through the melting range. High-temperature, amorphous polymeric binders can also be used for microwave temperature control. This time the glass transition temperature is above room temperature, and the discontinuity in thermal expansion coefficient at $T_g$ provides temperature control.

At the transition temperature of the polymer matrix, the matrix will expand and push the microwave reactive particles apart, and amplified by concomitant changes in the tunnelling and percolation phenomena, conductivity drops precipitously. Below the transition temperature, the composite is a conductor while above the melting point it is an insulator. The increase in resistivity with temperature above the transition temperature is called the PTC (positive temperature coefficient of resistivity) effect. There are instances, however, where there is a decrease in resistivity with temperature above the melting point which is referred to as the NTC (negative temperature coefficient of resistivity) effect, which, in a self-limiting heater composition is to be minimized or avoided. Thus, the decrease in conductivity associated with the melting in the crystalline regions can be followed, at higher temperatures by an increase in conductivity i.e., NTC phenomenon. In a carbon black-polyolefin model, it has been theorized that attractions between polar groups on the black particles trigger the formation of a black network in the less viscous polymer matrix around the crystalline nuclei thereby increasing conductivity.

Thus, it can be seen that the selection of polymers as well as microwave reactive materials is critical to obtaining a self-limiting microwave heater.

The design of the heater also has to take into account the fact that the impedances of microwave reactive material particles-polymer composites have significant capacitive components. The spacings between the particles is narrow enough and the adjacent areas are large enough that significant amounts of charge can be stored at the interfaces. The composite can be analogized to a resistor in series with a parallel resistor-capacitor combination, rather than a straight resistor. At high frequencies, the capacitive elements may carry a significant portion of the current, while at low frequencies, they will not. This capacitance depends on separation of the particles from one another in the polymer matrix but this is a linear relationship. Since the PTC affect is brought about by the large sensitivity of tunnelling current to the particle separation it will be appreciated therefore that at higher frequencies a larger portion of the current will pass through the capacitor-like structure of the composite as compared to lower frequencies, and accordingly, the PTC effect will be less prominent at higher frequencies. This effect has to be taken into account in the selection of the microwave reactive material and the polymer composites, especially for microwave heaters that operate at frequencies from about 2.0 GHz to about 3.0 GHz and especially at about 2.45 GHz plus or minus 50 MHz.

Although at one point it had been theorized that the microwave reactive materials that would perform optimally in the self-limiting microwave heater of the present invention would be those that provide the greatest conductivity at low concentrations, it has been determined, according to the present invention that this is not necessarily the case. Microwave reactive materials that yield high composite conductivity at low concentration will also percolate at lower concentrations. The conductivity of these composites near percolation, where temperature control is viable can be relatively low. Thus, in order to optimize conductivity at percolation, microwave reactive materials of less structure are superior even though they provide less conductivity at low concentration. Materials must be selected so that they are not excessively agglomerated, but rather have sufficient conductivity and lack of structure so that percolation will occur at high enough conductivity so as to enable the self-limiting microwave heater to develop temperatures suitable not only for heating, but also, in some applications, for browning and crisping food items.

The present invention therefore is based on the discovery of certain types of microwave reactive conductive materials and polymer matrix materials in combination that are selected according to the foregoing criteria and which are utilized in the form of a thin film, coating, printed material, molded material or extrusion material to provide a self-limiting microwave heater for heating, and especially browning or crisping foods.

The conductive materials that have been found to be especially suitable in this regard are those consisting essentially of conductive carbon black materials and conductive graphite materials. Mixtures of various types of conductive carbon black materials may be employed as well as mixtures of various types of graphite materials. Additionally, mixtures of conductive carbon black materials with conductive graphite materials can also be utilized according to the present invention.

The preferred conductive material consists essentially of the conductive carbon blacks. The conductive carbon black materials in this regard comprise those having a surface area, as measured by nitrogen absorption, of less than about 160 m$^2$/g and especially from about 5 to about 160 m$^2$/g and especially from about 15 to about 150 m$^2$/g. The conductive carbon black materials are also selected to have a specific particle structure as measured by dibutyl phthalate (DBP) absorption of less than about 150 cc/100 gm and especially from about 30 to about 150 cc/100 gm preferably from about 50 to about 140 cc/100 gm. The conductive carbon black materials of the present invention should also have an average particle size of from about 10 to about 120 nm and especially from about 15 to about 100 nm and preferably from about 17 to about 90 nm. Conductive carbon black materials falling within the foregoing ranges of nitrogen surface area and DBP absorption may also be employed as blends. Thus, conductive carbon black materials having a particle size from about 20 nm to about 35 nm may be employed in combination with carbon blacks having particle sizes of from about 40 to about 90 nm. The ratio of the larger particle size carbon blacks to the smaller particle size carbon blacks can be anywhere from about 80/20% by weight to about 60/40% by weight. Carbon blacks for this purpose can be obtained from Huber Engineered Carbons and are listed below in Table 1 and Cabot Special Carbon Blacks in Table 2.

TABLE 1

HUBER ENGINEERED CARBONS

| Hard | Average Particle Diameter, nm | Nitrogen Surface Area m²/g | DBP Absorption No., cc/100 g |
|---|---|---|---|
| Hard | | | |
| Huber N110 | 20 | 143 | 113 |
| Huber N220/ARO 11* | 22 | 119 | 113 |
| Huber N231 | 21 | 114 | 91 |
| Huber N234 | 21 | 125 | 125 |
| Huber N326 | 26 | 80 | 72 |
| Huber N330/ARO 3* | 29 | 81 | 102 |
| Huber N339 | 25 | 90 | 120 |
| Huber N343 | 24 | 96 | 131 |
| Huber N347 | 26 | 88 | 124 |
| Huber N351 | 28 | 78 | 120 |
| Huber N375 | 24 | 100 | 114 |
| Soft | | | |
| Huber N539 | 44 | 40 | 111 |
| Huber N550/ARO 5* | 45 | 41 | 121 |
| Huber N650 | 47 | 38 | 122 |
| Huber N660 | 50 | 34 | 90 |
| Hard | | | |
| Huber N683 | 46 | 39 | 133 |
| Huber N762 | 56 | 26 | 65 |
| Huber N774 | 60 | 29 | 72 |
| Huber N787/ARO 7* | 54 | 30 | 80 |
| Huber ARO60* | 90 | 24 | 58 |
| Huber N990/ARO 15* | 320 | 8 | 43 |

*Arosperse series, treated at higher temperatures to reduce volatile content.

TABLE 2

CABOT SPECIAL CARBON BLACKS

| Fluffy | Pellets | Surface Area m²/gm. | Particle Size nm. | DBP Absorption cc/100 gm. Fluffy | DBP Absorption cc/100 gm. Pellets |
|---|---|---|---|---|---|
| — | VULCAN ® P | 140 | 20 | 116 | |
| — | VULCAN 9A32 | 140 | 19 | 114 | |
| REGAL ® 660R | REGAL 660 | 112 | 24 | 60 | |
| — | BLACK PEARLS ® 570 | 110 | 24 | 114 | |
| REGAL ® 400R | | 96 | 25 | 69 | |
| — | BLACK PEARLS 520 | 110 | 24 | 92 | |
| REGAL 330R | REGAL 330 | 94 | 25 | 70 | |
| REGAL 300R | — | 80 | 27 | 85 | — |
| — | BLACK PEARLS 490 | 87 | 25 | — | 124 |
| — | BLACK PEARLS 480 | 85 | 25 | — | 120 |
| — | BLACK PEARLS 470 | 85 | 25 | — | 114 |
| — | BLACK PEARLS 460 | 84 | 25 | — | 102 |
| — | BLACK PEARLS 450 | 80 | 27 | — | 72 |
| — | BLACK PEARLS 430 | 80 | 27 | — | 72 |
| — | BLACK PEARLS 420 | 73 | 26 | — | 120 |
| — | BLACK PEARLS 410 | 73 | 27 | — | 123 |
| REGAL 250R | REGAL 250 | 50 | 35 | 46 | 46 |
| REGAL 99R | REGAL 991 | 46 | 36 | 65 | 63 |
| — | ELFTEX ® PELLETS 115 | 66 | 27 | — | 115 |
| ELFTEX 5 | — | 80 | 27 | 118 | — |
| ELFTEX 8 | | 85 | 27 | 100 | — |
| ELFTEX 12 | — | 43 | 37 | 95 | — |
| — | BLACK PEARLS 280 | 42 | 41 | — | 121 |
| — | BLACK PEARLS 170 | 35 | 50 | — | 122 |
| — | BLACK PEARLS 160 | 35 | 50 | — | 90 |
| — | BLACK PEARLS 130 | 25 | 75 | — | 70 |
| MONARCH 120 | BLACK PEARLS 120 | 25 | 75 | 72 | 64 |

The "ARO" series of materials in Table 1 are variations of the "N" grade materials indicated which have been treated at higher temperatures to reduce volatile content.

The various polymers that have been found suitable in the foregoing respects, consist essentially of polycarbonates, methylpentene copolymer, polyvinyl alcohol, polyvinylidene fluoride and cellulose esters such as cellulose acetate propionate, cellulose butyrate and cellulose acetate butyrate.

The polycarbonate resins typical of resins controlling by means of $T_g$ comprise those polymers based on reaction of a dihydric aromatic alcohol with phosgene, the dihydric aromatic compounds comprising bisphenol A, bisphenol F, and the like. These resins are described further in Kirk-Othmer, *Encylopedia of Chemical Technology*, 3rd Ed. under the heading "polycarbonates" which is incorporated herein by reference.

The methylpentene copolymer typical of resins controlling by means of $T_m$, is obtained by the dimerization of propylene to a monomer, 4-methyl pentene-1, which is polymerized to form the methylpentene copolymer.

The polycarbonate resins are commercially available products that can be obtained from General Electric Plastics such as Lexan ® PPC 4504 and PPC 4704 (polyphthalate carbonate) FDA Food Grade Resins for Lexan ® PPC 4501 and PPC 4701 respectively. Polycarbonate resins that are also suitable include the Calibre ® polycarbonates from Dow Chemical Company and APEC ™, High-Heat polycarbonate and Makrolon ™ polycarbonate obtained from Miles Polymer Division. Especially suitable polycarbonates are the APEC ™ HT DP 9-9330, 9340, 9350, 9360 and 9370 types.

In one preferred aspect of this embodiment, when the microwave reactive material consists essentially of carbon black or graphite, the microwave reactive material combined with binder will preferably have a resistivity ranging from about 25 ohms per square to about 100,000 ohms per square and especially from about 100 ohms per square to about 50,000 ohms per square at room temperature.

In a preferred embodiment of the invention, the microwave reactive material will be suitable for food packaging. Alternatively, the microwave reactive material will be separated from the food by a film or other protective means.

It is preferred that the dispersion demonstrate rapid heating to a desired temperature, with subsequent leveling off of the temperature, without arcing during exposure to microwave radiation. The temperature at which the dispersion levels off is hereinafter referred to as the self-limiting temperature. Generally, the dispersion will operate at a temperature ranging from about 200° F. to about 480° F.; especially about 275° F. to about 480° F.; and preferably about 300° F. to about 450° F. or about 350° F. to about 400° F.

The microwave reactive material is combined with a binder to form an extrusion, molding or coating composition. The binder used in this invention can comprise a polycarbonate, polyvinylidene fluoride or a methylpentene copolymer extrusion or molding composition or any aqueous dispersion (e.g., latex) or organic liquid dispersion thereof or solution thereof that can be used in a roller coating, spray coating, immersion or printing process or a solvent casting process to form a free film of the dispersion. The binder must have good thermal resistance and suffer little or no degradation at the temperatures generated by the microwave reactive material. It should also have an adhesive ability which will allow it to adhere to the substrate.

The binder and the microwave reactive material are generally combined in a suitable ratio such that the microwave reactive material, in the form of an extrusion, molding or coated or printed thin film, can convert the microwave radiation to heat and raise the temperature of a food item placed thereon, yet still have sufficient binder to be extruded or molded and when coated or printed, to adhere to the substrate or film. There should also be sufficient binder present to prevent arcing of the microwave reactive material. The ratios are also dependent on percolation and the degree of thermal expansion of the binder.

Generally, the ratio of the microwave reactive material to binder, on a solids basis, will depend upon the microwave reactive material and binder chosen. In a preferred embodiment, where the microwave reactive material is carbon black or graphite and the binder is a polycarbonate, polyvinylidene fluoride, methylpentene copolymer, polyvinyl alcohol or a cellulose ester, the microwave reactive material to binder ratio, on a weight basis, is about 10:90 to about 45:55 or higher and especially from about 15:85 to about 40:60.

The microwave reactive material, thus in combination with the binder, comprises the dispersion of the present invention and the binder will go through a first order phase transition or a second order phase transition at a temperature of from about 200° F. to about 480° F. The dispersion is near the percolation threshold at about room temperature (approx. 70° F.) and its conductivity drops above the binder phase transition temperature. The drop in conductivity is at least about 1.5 orders to about 2 orders of magnitude or higher as compared to the conductivity before the binder phase transition and in some instances at least about 5 to about 7 orders of magnitude, or higher, again, as compared to the conductivity before the binder phase transition. Thus, the range for the drop in conductivity is from at least about 1.5 orders of magnitude to about 7 orders of magnitude or higher.

Other materials can be included in the composition, such as surfactants, dispersion aids, lubricants and other conventional additives for extrusion, molding, coating or printing compositions.

The dispersion is advantageously used as a film of from about 0.1 to about 10 mils thick, where such film is obtained by one of the methods described herein including coating, casting, printing or extruding. Films from about 0.3 to about 0.6 mils are especially useful for heating foods such as popcorn and films from about 0.6 to about 1 mil are especially useful for heating pizza.

The coating can be applied using conventional roller, immersion or spray coating methods or printing processes such as rotogravure, flexography and lithography. After the coating composition has been applied it can be dried using conventional ovens such as those normally provided in a coating or printing process.

The extrusion and molding compositions are used in conventional extruding and molding apparatus.

Generally, any amount of coating can be used in the present invention. The amount of heat generated will vary according to the amount and type of coating applied to the substrate. In a preferred embodiment, when the coating material is carbon black, or graphite the amount of coating will range from about 2 to about 25 pounds per 3,000 square feet.

The coating composition can generally be coated upon any substrate, such as paper or paperboard or any suitable film material. Typically, any substrate which is microwave radiation transparent, or otherwise can be used in a microwave process can have the microwave reactive coating of the present invention applied to it.

In another embodiment of this invention, the coating composition is printed onto a thermoplastic film. The film can be selected from any known films such as polyesters, nylons, polycarbonates and the like. The film should also have a melting point above the operating temperature of the microwave reactive material. A particularly preferred class of films include polyester films such as Mylar ® (PET).

In another embodiment of this invention, the film thus coated is applied to a microwave transparent substrate. The substrate, preferably, is also dimensionally stable at the operating temperature of the microwave reactive material. Other substrates such as glass, ceramic and equivalent materials can be used. Typical substrates include paper and paperboard. The coating can also be applied directly to the microwave transparent substrate e.g., paper or paperboard.

In another embodiment a printing process is used to provide a microwave interactive coating on paper or paperboard and thereby provide increased flexibility in the application of the coating to a substrate. Patterns can be made in the coating and can be applied using conventional printing techniques to precisely locate the coating on the substrate. Furthermore, different coating thicknesses can be applied simultaneously where foods requiring different levels of heating are utilized in the same paperboard or other container. Printing processes require fewer steps, are more continuous processes and further avoid the problems of smoothness, outgassing and optimum control required in the metallization process used to make the metallized PET.

The extruded, molded or cast film dispersions not only can be used as patches applied to other packages or, paper or a paperboard substrate, but can also be formed into sheets and thermoformed into trays or cups which are microwave interactive and temperature limiting. Thermoformed trays can be made by means of conventional vacuum molding techniques.

The compositions of the present invention may also be formulated as injection molding compounds for use in injection molding processes well known in the art.

The following examples are illustrative.

Various coating compositions were prepared and evaluated for self-limiting microwave heater application, the results of such evaluations being set forth in FIGS. 1–14.

EXAMPLE 1

Referring to FIG. 1, a polycarbonate resin, manufactured by General Electric Co., Lexan ® PPC 4701, was dissolved in methylene chloride solvent to form a 15% by weight solution. The resultant solution was combined with carbon black manufactured by the Cabot Company and designated as Cabot BP160. Coating compositions comprising 30, 35 and 40% by weight of carbon black based on the formulation solids were prepared and coated onto a paper substrate at a dry coating weight of 9 lbs./3000 square feet. Various samples of the dried coating were placed in a conventional oven and heated to temperatures of 50°, 100°, 150° and 200° C. The surface resistivity (ohms/sq) was measured at each one of these temperatures and the results plotted as illustrated in FIG. 1. It can be seen by reference to FIG. 1 that the increase in resistivity translates into a drop in conductivity (conductivity being the reciprocal of resistivity) as the temperature increases. The magnitude of this shift indicates that the coating compositions are self limiting coatings.

EXAMPLE 2

A polyvinylidene fluoride polymer (Kynar TM) manufactured by ATOCHEM North America was similarly dissolved in dimethyl formamide solvent to form a solution comprising 15% by weight of resin. This solution was combined with the BP 160 carbon black at solids ratios of 83/17 and 74/26, polymer to carbon black. These coatings were applied to a paper substrate at a dry coating weight of 3 lbs/3000 square feet. Samples of dry coated paper were then heated in a conventional oven at temperatures of 50°, 100°, 150° and 200° C. and the resistivity (ohms/sq) was measured at each one of these temperatures. The results of these evaluations were plotted as set forth in FIG. 2, which again illustrates that the change in resistivity as temperature increases signifies a drop in conductivity and shows the suitability of these coatings as a self limiting microwave heater.

EXAMPLE 3

A high temperature polycarbonate (Lexan ® PPC 4701), carbon black (BP-160) coating having a 40% by weight pigment loading and as prepared according to Example 1 and evaluated as set forth in FIG. 1 was further tested by inserting the coated sample crosswise in an instrumented S-band wave guide driven at 2.45 GHz by a Gerling high power microwave source at power levels of 139, 319 and 385 Watts. Measurements for the power fractions, transmitted, reflected and absorbed, versus time, and temperature versus time were made and plotted as set forth in FIGS. 3A, 3B, 4A, 4B and 5A, 5B, from which it can be seen that the sample came up to a temperature of about 350° F. in about 10 seconds and this temperature was maintained for a period of time of about 60 seconds. The percentage of absorbed microwave energy decreased as the power was increased which conclusively demonstrates that the coating composition is in fact "self-limiting."

EXAMPLE 4

Microwave popcorn bags were prepared by adhesive laminating patches of paper coated with 7–9 lb./3,000 sq. ft. of the coating from Example 3 to preformed bags without heaters. The size and position of these patches were the same as the metallized film in the control bags which are conventional microwave popcorn bags.

The control and test bags were filled with a standard charge of popcorn, oil and salt. These bags were heated in a Litton-type microwave oven with a power level of 600 Watts and a frequency of 2.45 GHz for 200 sec. The temperature response, pop volume and number of no pops of the test bag were slightly better than the control bags, thus, demonstrating the excellent performance of these self-limiting microwave heaters.

EXAMPLE 5

A commercial pre-packaged pizza was evaluated with one of the self-limiting microwave heaters of the present invention. The pizza, as sold, is on a paper tray with a metallized microwave reactive film. This metallized film was replaced with paper coated with 9–12 lb/3000 sq. ft. of the coating from Example 3 and the pizza placed on the tray with the paper coating and heated in a Litton microwave oven at 600 Watts and 2.45 GHz frequency for 320 seconds. Very satisfactory browning and crisping of the pizza crust was obtained.

EXAMPLE 6a–6f

A polycarbonate resin (12 g of Lexan ® PPC 4701, a polyphthalate carbonate resin from GE Plastics) is dissolved in 108 g of methylene chloride. To this was added 8 g of carbon black (Black Pearls 160 from Special Blacks Division of Cabot Corp.) and 5 g of methylene chloride. This mixture (a 60/40 blend of resin and carbon black at a total solids of 15%) was stirred until the carbon black was thoroughly wet. Then, 175 g of steel shot was added and the mixture stirred rapidly until the carbon black was uniformly dispersed (pass a No. 7 on a Hageman Grind Gauge).

The coating was applied to paper substrates with a Bird Film Applicator and allowed to air dry.

The resistivity vs. temperature data was obtained by placing a one inch wide strip of the coated paper in a forced draft oven. The electrodes of a digital volt-amp meter were attached to conductive strips (Electrodag 461SS from Acheson Colloids Co.) painted across these strips at one inch spacing, and readings taken at the desired temperatures.

By using the above general procedure and adjusting the ratios as necessary, coatings with the carbon blacks shown in Table 3 were prepared. In all cases Lexan PPC 4701 was used as the binder.

Figure 6:
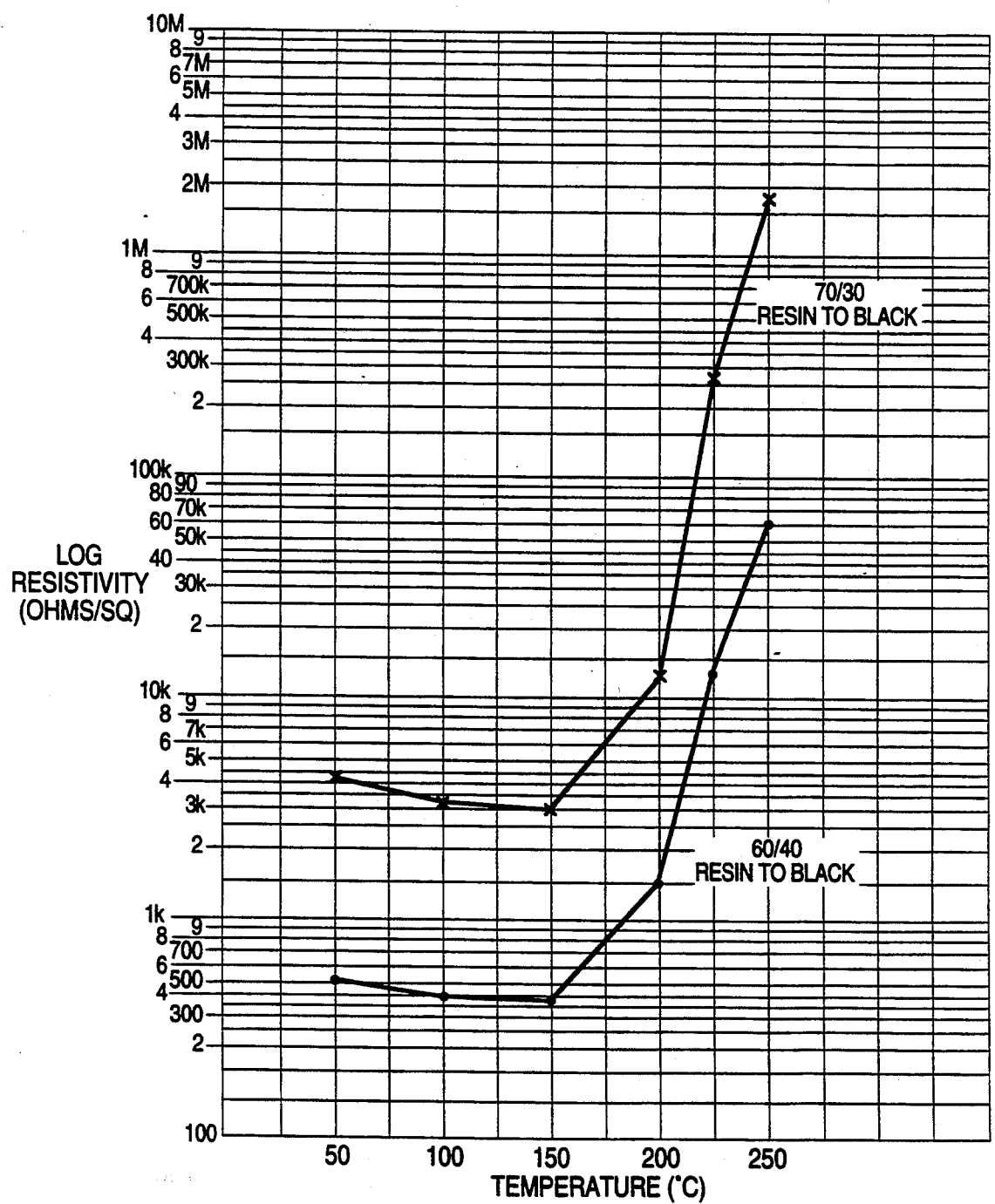

The change in resistance with temperature for these coatings at 10 lb/3000 sq. ft. provides a good comparison of the self-limiting potential of these formulations. FIG. 6 shows this relationship for Example 6a.

These data indicate that by using this particular polycarbonate resin with carbon blacks of the types shown in Table 3, Examples 6a–6e coatings were obtained which had both the desired level of conductivity (thus the desired level of microwave absorption for rapid heating) and a sufficient loss in surface conductivity (1/surface resistivity) at a desired temperature in the range of 100° C. to 250° C. to provide the essential self-limiting characteristics of these microwave interactive coatings.

Figure 7:
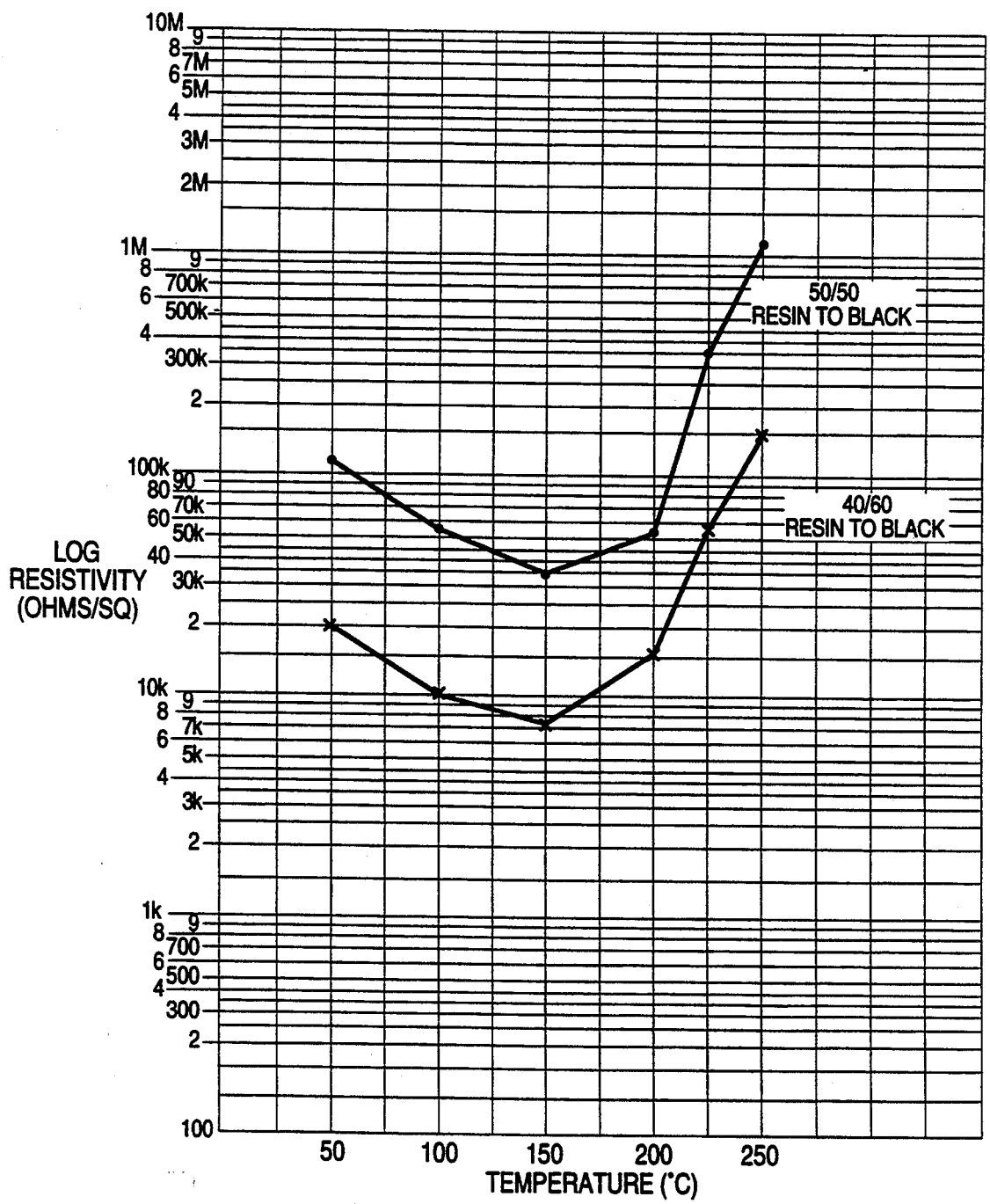
Figure 8:
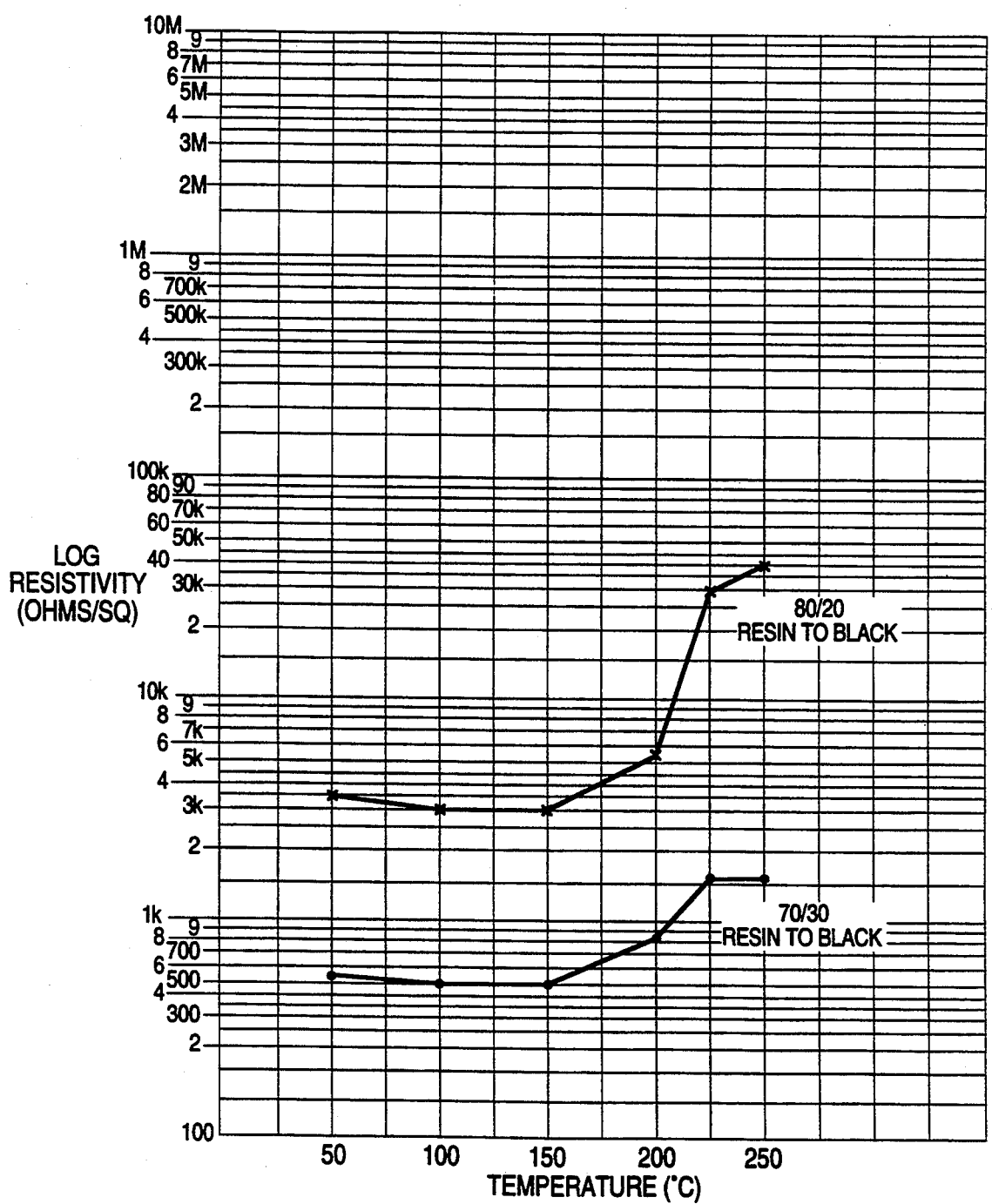
Figure 9:
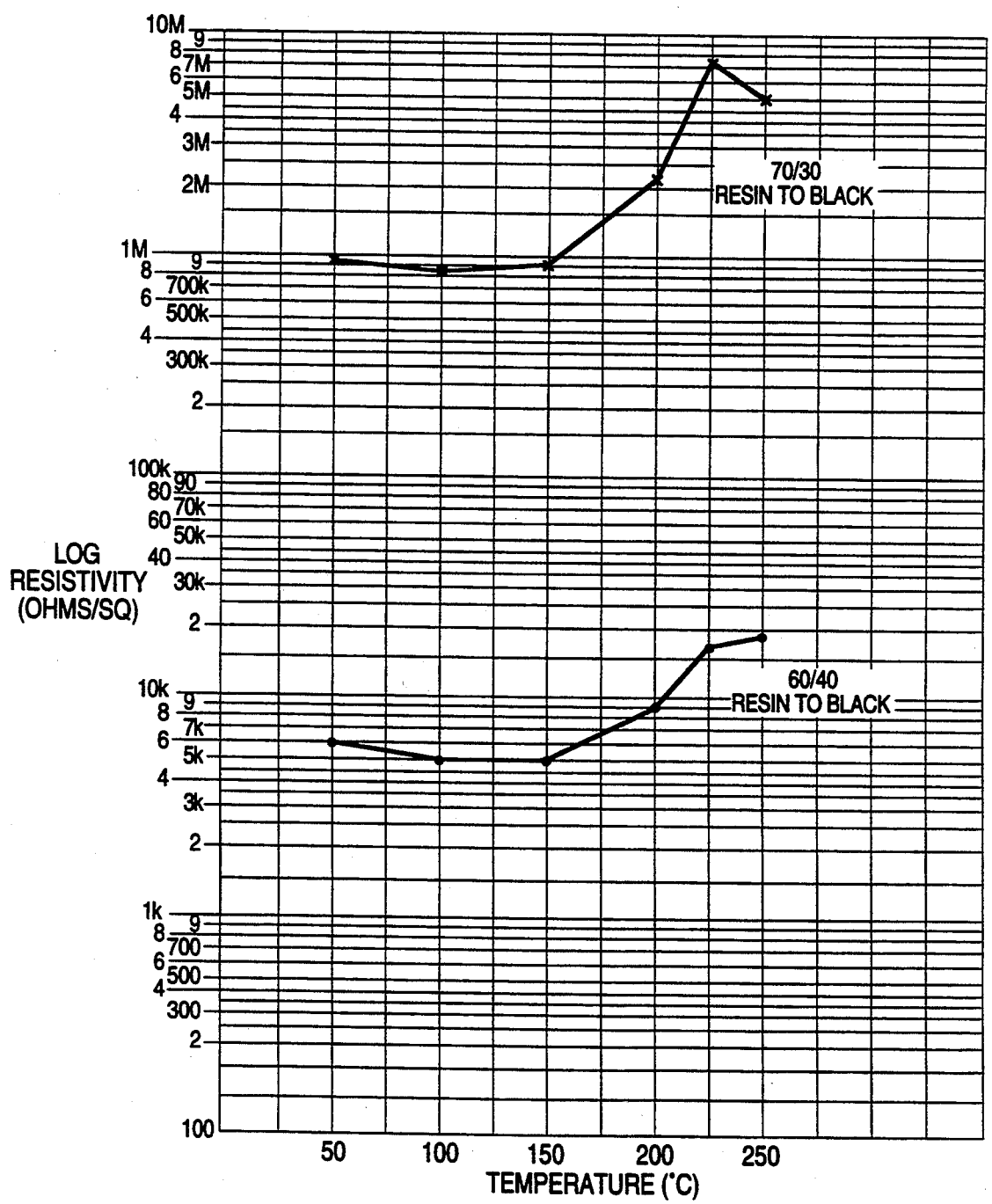

Under these same conditions, the types of carbon blacks shown in FIGS. 7–9, Examples 6f–6h (shown at 10 lb/3000 sq. ft.) either did not provide the desired levels of conductivity and/or the desired degree of loss of conductivity with temperature to provide a self-limiting response.

To confirm that these coatings did indeed provide both rapid heating and self-limiting response when exposed to microwaves, samples of these coatings (at 10 lb/3000 sq. ft.) were evaluated in the Gerling power supply basic measurement system. The primary components of this system are 1.5 kW microwave source operating at 2.45 GHz±50 MHz, a variable controller, an S-band waveguide sample holder/applicator, three power meters with directional couplers, Luxtron fluoroptic temperature measuring equipment and a computer. This system can measure the portion of reflected energy, the portion of transmitted energy and calculate the portion of absorbed energy as a function of time under microwave application.

Test results obtained from the Gerling system in evaluating a 60/40 Lexan PPC 4701/Black Pearls 160 coating from Example 6a show that as the incident power level is increased from 139 watts to 319 watts and finally to 385 watts, FIGS. 3A, 3B, 4A, 4B and 5A, 5B, the rate of temperature rise increases slightly and the percent of Power Fraction absorbed decreases; however, the controlling temperature remains essentially constant. These results are typical of those formulations that provide the desired rapid temperature heat-up and self-limiting control.

Figure 10A:
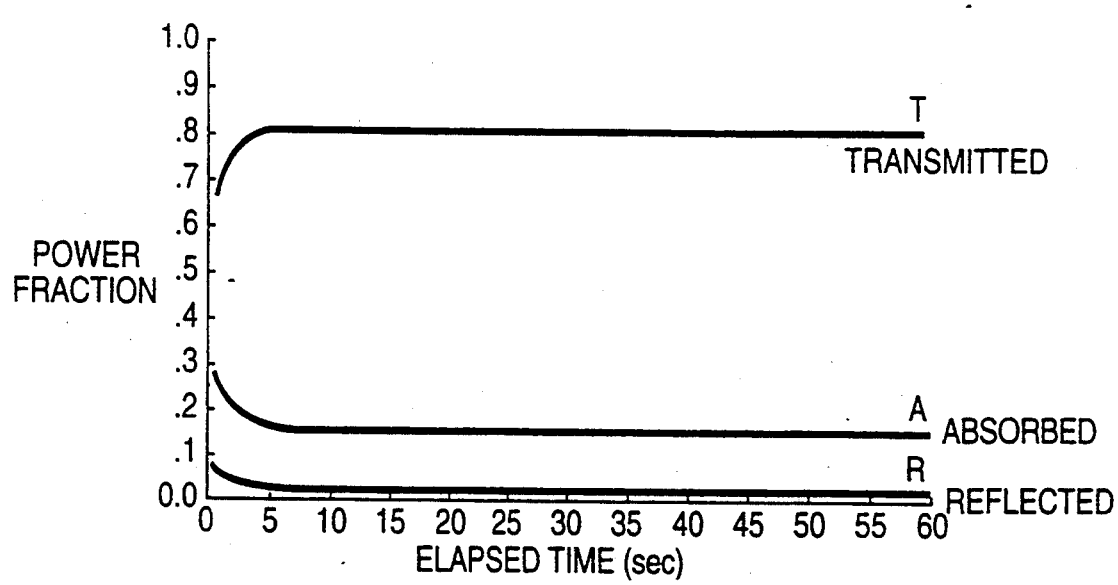
Figure 10B:
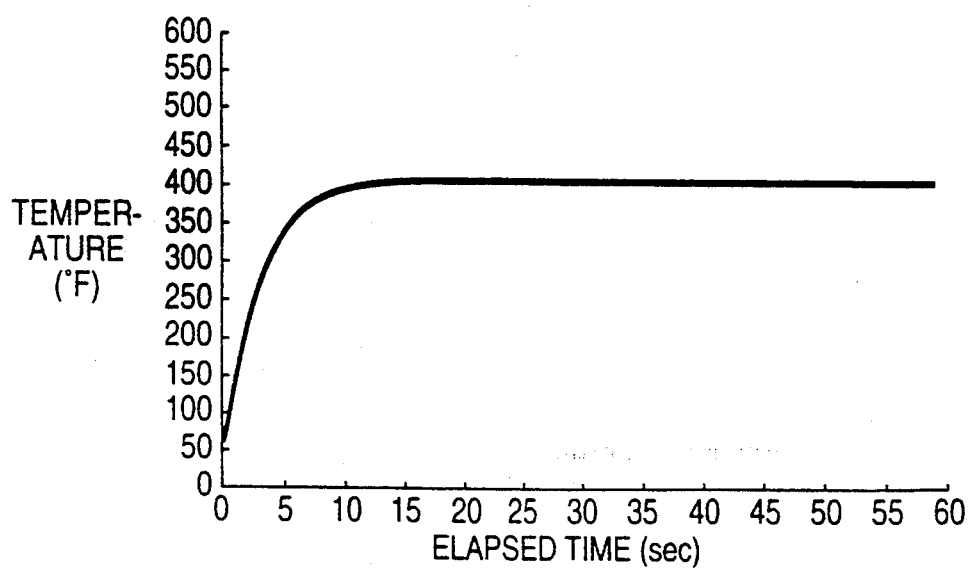
Figure 11A:
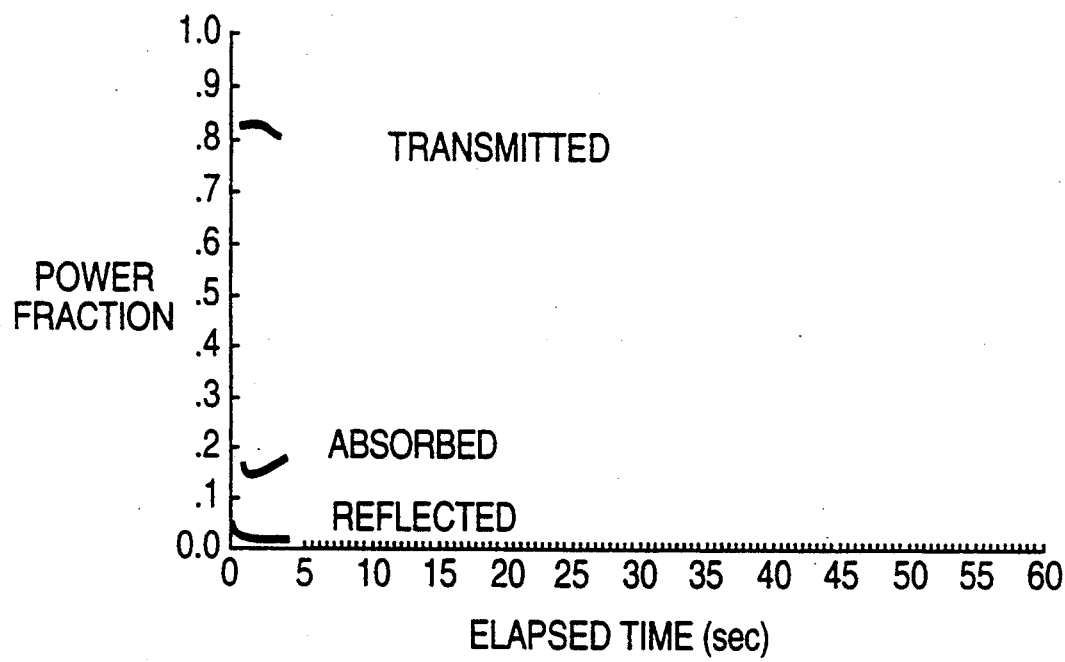
Figure 11B:
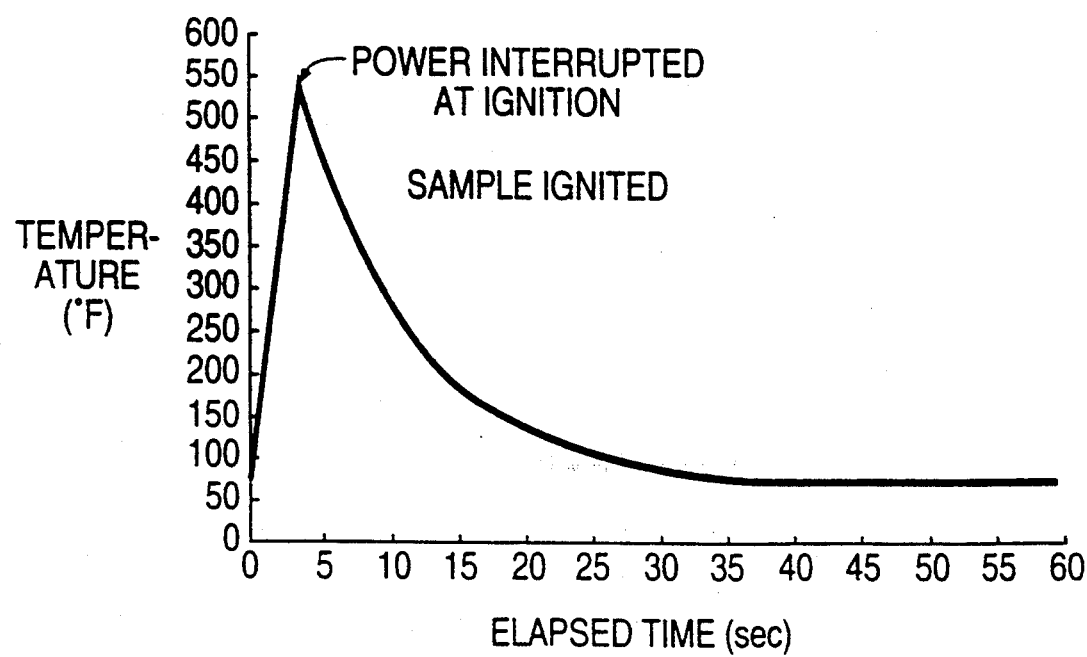

FIGS. 10 and 11 show the test results obtained from the Gerling system in evaluating a 75/25 Lexan ® PPC 4701/Vulcan XC72 coating. At an incident power level of only 135 watts the coating appeared to be self-limiting as the drop in absorption (which corresponds to a decrease in conductivity) was adequate to hold the average temperature at approximately 350° F. However, as the incident power level was increased to 291 watts (FIG. 11) the shift in absorption was not adequate to control the temperature rise resulting in "run away" heating and ignition of the sample. These results are typical of those formulations that do not provide an adequate shift in conductivity to provide the desired self-limiting control.

TABLE 3

| Example No. | Carbon Black | Avg. Particle Diameter, nm | Nitrogen Surface Area, $m^2/g$ | DBP Absorption No., cc/100 g | Binder to Carbon Black Ratio |
| --- | --- | --- | --- | --- | --- |
| 6a (FIG. 6) | Black Pearls 160[1] | 50 | 35 | 90 | 60/40, 70/30 |
| 6b | N-765[2] | 60 | 33 | 110 | 60/40, 70/30 |
| 6c | Arosperse 7[2] | 54 | 30 | 80 | 60/40, 70/30 |
| 6d | Arosperse 60[2] | 70 | 24 | 58 | 60/40, 70/30 |
| 6e | Arosperse 11[2] | 22 | 119 | 113 | 60/40, 70/30 |
| 6f (FIG. 7) | Arosperse 15[2] | 320 | 8 | 43 | 50/50, 40/60 |
| 6g (FIG. 9) | Black Pearls 1100[1] | 14 | 240 | 50 | 60/40, 70/30 |
| 6h (FIG. 8) | Vulcan XC72[1] | 30 | 254 | 178 | 70/30, 80/20 |

[1]Obtained from Special Blacks Division of Cabot Corp.
[2]Obtained from Huber Engineered Carbons

EXAMPLE 7

Following the general procedure outlined in Example 6 the series of polycarbonate resins shown in Table 4 were all formulated with carbon black, Black Pearls 160 from Cabot, at 60/40 and/or 70/30 resin to carbon black ratio. The self-limiting temperature range demonstrated in the Gerling system, with each resin is shown in Table 4.

In general the performance of all of these polycarbonate resins was quite favorable in this application. However, there were significant differences. The general purpose polycarbonates, with lower Vicat softening points of from about 305° F. to about 315° F. gave lower self-limiting temperatures while the so called "high heat" grades, with higher Vicat softening points of from about 320° F. to about 400° F., gave high self-limiting temperatures.

The advantage is that within the polycarbonate resins alone, one has a broad range of performance characteristics that can be utilized to match the heater performance with the needs of the individual packaging application.

TABLE 4

| Polycarbonate Resin | VICAT Softening Pt (°F.) | Self-Limiting Temp. Range (Gerling System Data) (°F.) |
| --- | --- | --- |
| General Purpose Polycarbonates | | |
| Lexan 101[1] | 305–315 | ~250–300 |
| Calibre 0200-4[2] | 306–316 | ~300–350 |
| High heat Polycarbonates | | |
| Lexan PPC 4701[1] | ~350 | ~325–375 |
| Apec HT DP9-9330[3] | 320 | ~350–450 |
| Apec HT DP9-9340[3] | 341 | ~350–390 |
| Apec HT DP9-9350[3] | 363 | ~350–450 |

TABLE 4-continued

| Polycarbonate Resin | VICAT Softening Pt (°F.) | Self-Limiting Temp. Range (Gerling System Data) (°F.) |
|---|---|---|
| Apec HT DP9-9360[3] | 383 | ~350–385 |
| Apec HT DP9-9370[3] | 401 | ~350–425 |

[1]GE Plastics
[2]Plastics Group, Dow Chemical Co.
[3]Polymers Div., Miles Inc.

EXAMPLE 8

13.5 g of a methylpentene copolymer (DX820 from Mitsui Petrochemicals, Ltd.) was dissolved in 127.5 g of hot cyclohexane. While keeping the mixture hot, 9 g of carbon black (Black Pearls 160 from Special Blacks Division of Cabot Corp.), 250 g of steel shot and 30 g of cyclohexane were added. Mixing was continued until the carbon black was uniformly dispersed (pass No. 7 Hageman Gauge). The coating was applied to a paper substrate with a Bird film applicator and immediately dried with a hot air gun. The resulting coatings were approximately 6.5 lbs/3000 sq. ft. of the 60/40 methylpentene copolymer/carbon black formulation.

Using similar conditions a 65/35 ratio formulation was also prepared and applied to paper.

Figure 12:
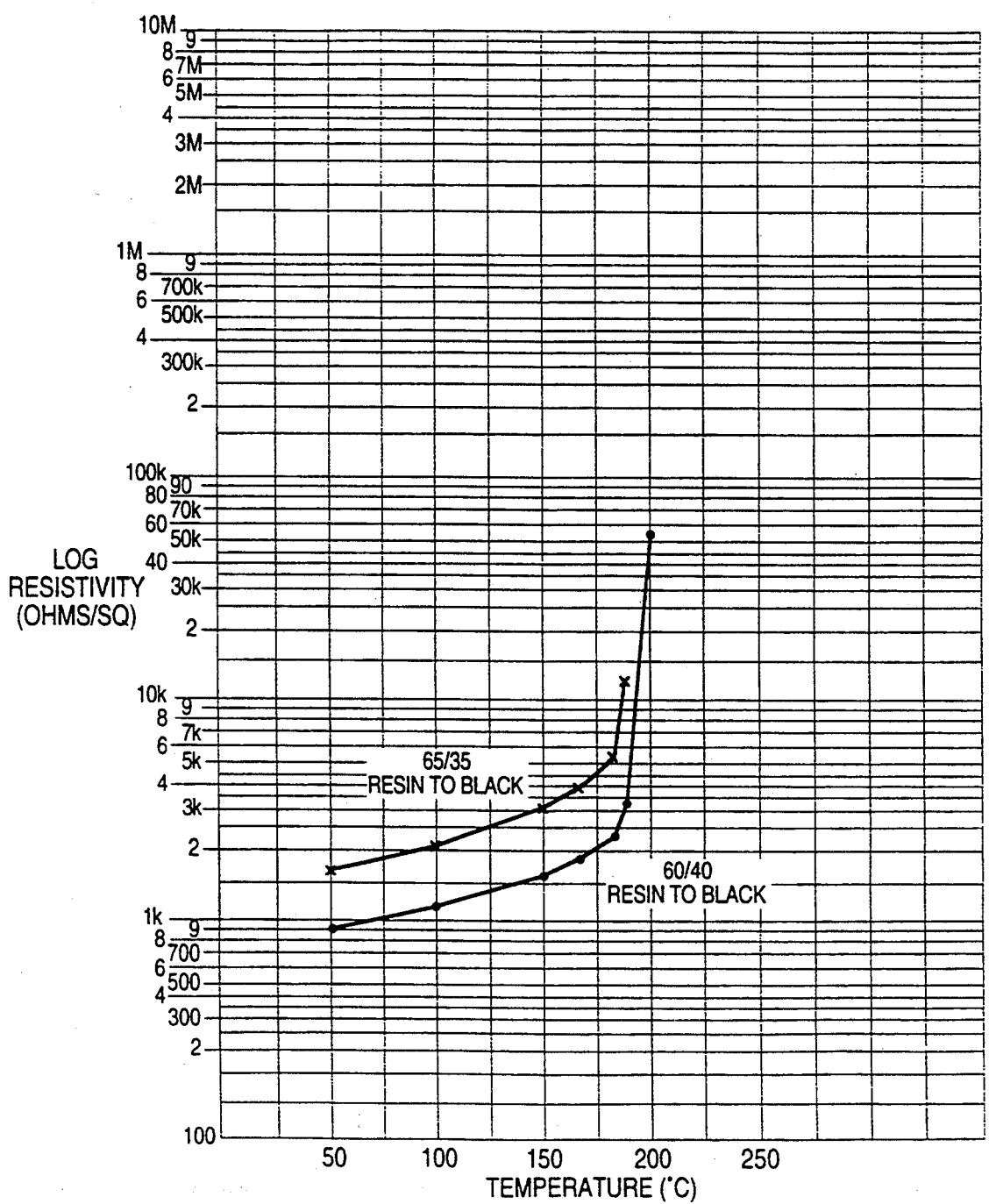

The resistivity vs. temperature response of samples from these coatings are shown on FIG. 12 (at 6.5 lb/3000 sq. ft.). Testing of samples of these coatings in the Gerling system described in Example 6 indicated the self-limiting temperatures of these formulations to be approximately 380°–420° F.

A 70/30 blend of this methylpentene copolymer and Black Pearls 160 carbon black was prepared by passing the combination through a twin screw extruder three times to obtain a uniform blend. Pellets of the resulting mixture was pressed into 4×4 sheets (5 mil and 9 mil thick) with a heated platen press. The resistivity vs. temperature response of these sheets were very comparable to the coatings on paper described above.

EXAMPLE 9

To 9.75 g of a cellulose acetate propionate resin (Tenite Propionate 377E from Eastman Chemical Co.) dissolved in 55.25 g of methyl ethyl ketone was added 5.25 g of carbon black (Black Pearls 160 from Special Blacks Division of Cabot Corp.), 29.75 g of methyl ethyl ketone and 150 g of steel shot. This mixture was stirred rapidly until the carbon black was well dispersed (about 45 min. pass No. 7 Hageman Gauge). This 65/35 resin to carbon black coating formulation was applied to a paper substrate with the Bird film applicators as described in Example 6.

Following a similar procedure, a coating containing a 40/60 resin to carbon black ratio of these same materials was also prepared.

Figure 13:
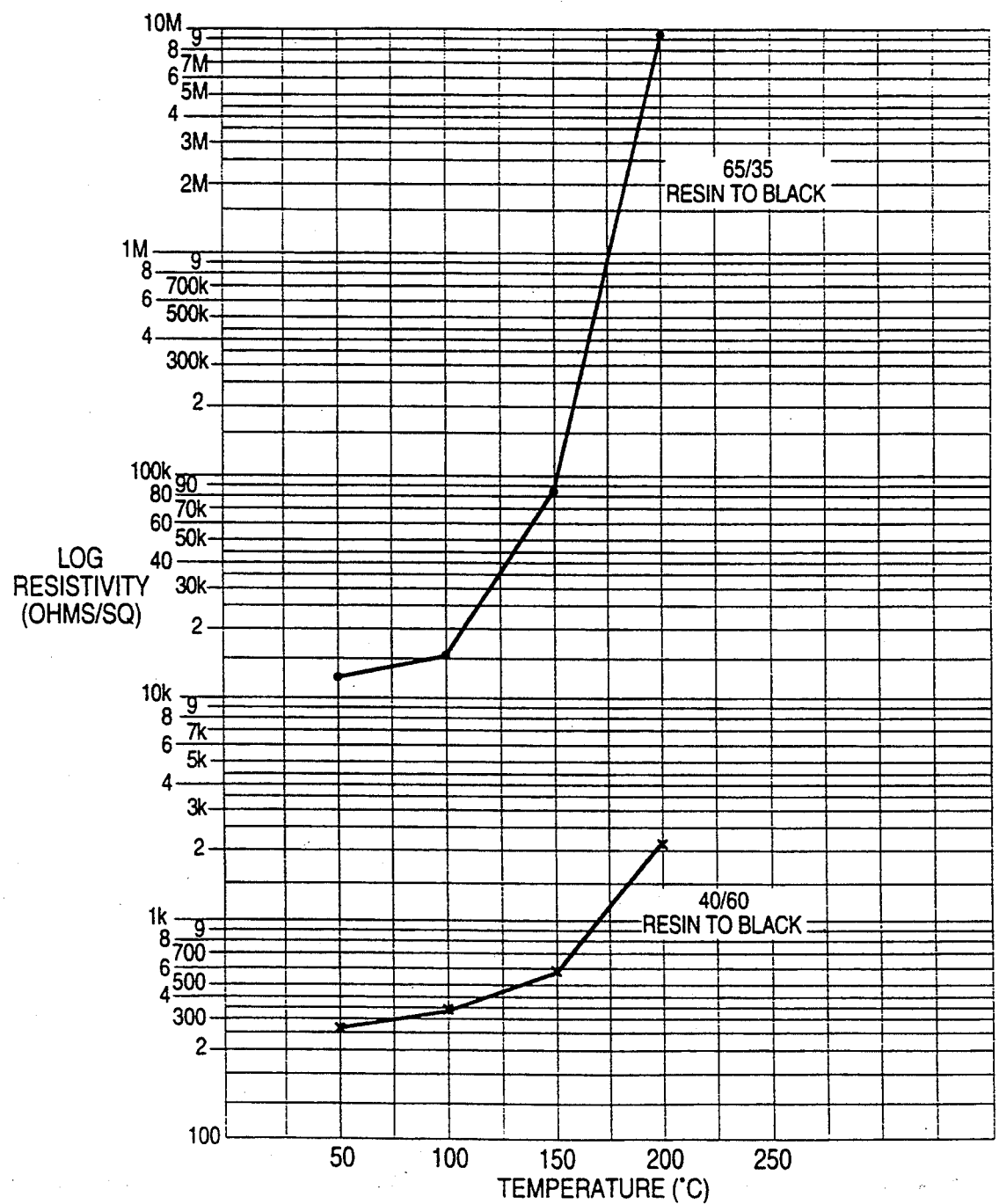

The resistivity vs. temperature response of samples of these coatings at 9 lb/3000 sq. ft. are shown in FIG. 13. These data indicate that a 65/35 formulation would be self-limiting.

EXAMPLE 10

To 8 g of polycarbonate resin (Lexan PPC 4701, a polyphthalate carbonate resin from GE Plastics) dissolved in 72 g of methylene chloride, was added 8 g of carbon black (Black Pearls 160 from Special Blacks Division of Cabot Corp.), 30 g of methylene chloride and 175 g of steel shot. This mixture was stirred at high speed until the carbon black was uniformly dispersed (about 45 min. pass No. 7 Hageman Gauge). To this was added 4 g of aluminum flake solids (Stapa CVIII paste from Obron Corp. which had previously been dispersed at 40% solids in a 1:9 isopropyl alcohol/ethyl acetate mixture) and gently stirred in. The resulting formulation with solids of 40% polycarbonate resin, 20% aluminum flake and 40% carbon black, was applied to a paper substrate with Bird film applicators.

Following a similar procedure with the same components, coatings were made that were 60% polycarbonate resin, 10% aluminum flake and 30% carbon black.

Figure 14:
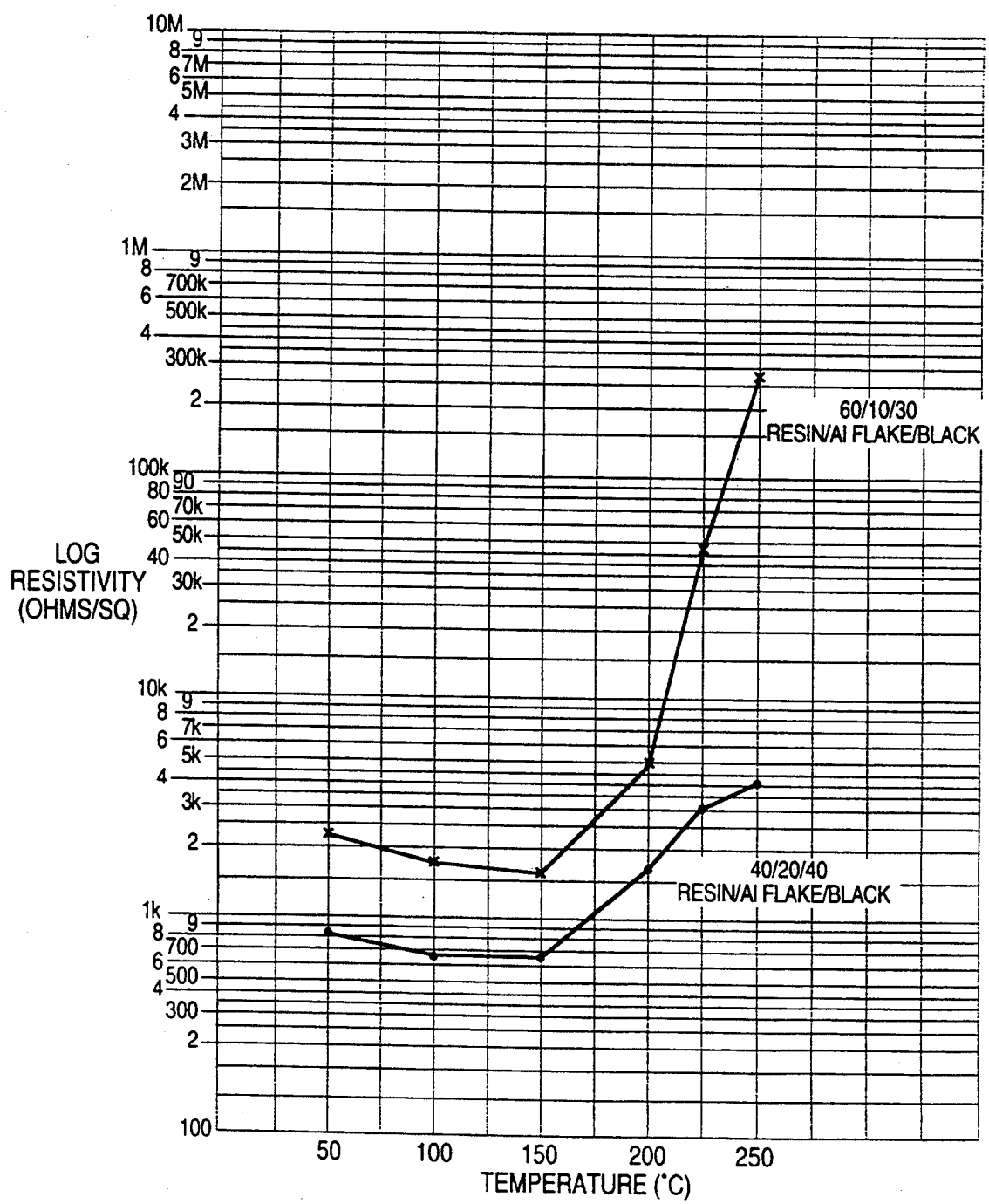

The resistivity vs. temperature response of samples of these coatings at 10 lb/3000 sq. ft. are shown in FIG. 14. These data, when compared to the same resin and carbon black formulations without the aluminum flake (FIG. 6), indicate that the aluminum flake provides only a very minor amount to the total conductivity of the coatings compared to the contribution made by the carbon black. It is also apparent that if coatings are compared at equal initial resistivity the amount of shift in resistivity with temperature is generally reduced in those formulations containing aluminum.

The data obtained with the Gerling test system tended to confirm the above results and showed that the aluminum flake is primarily functioning as a "dielectric" component rather than as a "conductive" component in these coatings.

These results indicate that low levels of metal flakes, like aluminum, can be tolerated in these coatings, but do not make a significantly positive contribution.

It will be apparent to those skilled in the art that various modifications and variations can be made in the microwave heater and the microwave heater composition and process of the present invention without departing from the spirit or scope of the invention. Thus it is intended that the present invention cover the modifications and variations of this invention provided they come within the scope of the appended claims and their equivalents.

What is claimed is:

1. A self-limiting dispersion of a conductive material in a binder where said conductive material consists essentially of a carbon material having a structure selected to have a percolation threshold when dispersed in said binder at a concentration of from about 10 weight percent to about 45 weight percent in said binder, said binder comprising a thermoplastic material selected to go through a first order phase transition or a second order phase transition at a temperature from about 300° F. to about 480° F. and said dispersion being near the percolation threshold so that its electrical conductivity drops at least about 1.5 orders of magnitude when above the binder phase transition temperature wherein said conductive material combined with said binder has a surface resistivity ranging from about 25 ohms per square to about 100,000 ohms per square at room temperature.

2. The dispersion of claim 1 wherein said conductive material combined with said binder will have a surface resistivity ranging from about 100 ohms per square to about 50,000 ohms per square at room temperature.

3. The dispersion of claim 1 wherein said conductive material consists essentially of carbon black or graphite having a nitrogen surface area of from about 5 to about 160 m$^2$/g, a DBP absorption number of from about 30 to about 150 cc/100 gm, and an average particle diameter of from about 15 to about 100 nm, said binder comprising a thermoplastic material selected to go through a first order phase transition or a second order phase transition at a temperature of from about 300° F. to about 480° F. when exposed to microwave radiation.

4. The dispersion of claim 3 wherein said binder consists essentially of a polycarbonate, methylpentene copolymer, polyvinyl alcohol or a cellulose ester.

5. The dispersion of claim 3 wherein said self-limiting temperature range is from about 300° F. to about 450° F.

6. The dispersion of claim 3 wherein said self-limiting temperature range is from about 350° F. to about 400° F.

7. The dispersion of claim 3 wherein said conductive material is present in an amount from about 15 to about 40% by weight.

8. The dispersion of claim 7 wherein said conductive material consists essentially of carbon black.

9. The dispersion of claim 8 wherein said binder consists essentially of a polycarbonate.

10. The dispersion of claim 9 wherein said polycarbonate consists essentially of a polyphthalate carbonate.

11. The dispersion of claim 9 wherein said polycarbonate has a Vicat softening point of from about 305° F. to about 315° F. and said microwave heater has a self-limiting temperature range of from about 300° F. to about 350° F.

12. The dispersion of claim 9 wherein said polycarbonate has a Vicat softening point of from about 320° F. to about 400° F. and a self-limiting temperature range from about 325° F. to about 450° F.

13. The dispersion of claim 8 wherein said binder consists essentially of a methylpentene copolymer.

14. The dispersion of claim 8 wherein said binder consists essentially of a polyvinyl alcohol.

15. The dispersion of claim 8 wherein said binder consists essentially of a cellulose ester.

16. The dispersion of claim 1 wherein said dispersion is a extrusion composition or solvent cast film composition.

17. The dispersion of claim 1 wherein said dispersion is a surface coating composition.

18. The dispersion of claim 17 wherein said dispersion is a liquid surface coating composition.

19. An article of manufacture comprising a self-limiting microwave heater wherein said heater comprises a film of a self-limiting dispersion of a conductive material in a binder, where said conductive material consists essentially of a carbon material having a structure selected to have a percolation threshold when dispersed in said binder at a concentration of from about 10 weight percent to about 45 weight percent in said binder, said dispersion being near the percolation threshold so that its electrical conductivity drops at least about 1.5 orders of magnitude when above the binder phase transition temperature, wherein said conductive material consists essentially of carbon black or graphite having a nitrogen absorption surface area of from about 5 to about 160 m²/g, a DBP absorption number of from about 30 to about 150 cc/100 gm, and an average particle diameter of from about 15 to about 100 nm, said binder comprising a thermoplastic material selected to go through a first order phase transition or a second order phase transition at a temperature of from about 300° F. to about 480° F. when exposed to microwave radiation, said film being from about 0.1 mils to about 10 mils thick.

20. The article of manufacture of claim 19 wherein said dispersion is a thermoplastic solid applied to a microwave transparent substrate by extrusion coating.

21. The article of manufacture of claim 19 wherein said dispersion is in the form of a thermoplastic film applied to a microwave transparent substrate by lamination.

22. The article of manufacture of claim 19 wherein said film is applied to a microwave transparent substrate by coating or printing.

23. An article of manufacture for heating food by microwave energy comprising a self-limiting dispersion of a conductive material in a binder where said conductive material consists essentially of a carbon material having a structure selected to have a percolation threshold when dispersed in said binder at a concentration of from about 10 weight percent to about 45 weight percent in said binder, said binder comprising a thermoplastic material selected to go through a first order phase transition or a second order phase transition at a temperature from about 300° F. to about 480° F., said dispersion being near the percolation threshold so that its electrical conductivity drops at least from about 1.5 to about 2 orders of magnitude when above the binder phase transition temperature, wherein said conductive material combined with said binder has a surface resistivity ranging from about 25 ohms per square to about 100,000 ohms per square at room temperature.

24. The article of manufacture of claim 23 wherein said conductive material combined with said binder will have a surface resistivity ranging from about 100 ohms per square to about 50,000 ohms per square.

25. The article of manufacture of claim 23 wherein said conductive material consists essentially of carbon black or graphite having a nitrogen surface area of from about 5 to about 160 m²/g, a DBP absorption number of from about 30 to about 150 cc/100 gm, and an average particle diameter of from about 15 to about 100 nm, said binder comprising a thermoplastic material selected to go through a first order phase transition or a second order phase transition at a temperature of from about 300° F. to about 480° F. when exposed to microwave radiation.

26. The article of manufacture of claim 25 wherein said conductive material is said carbon black.

27. The article of manufacture of claim 26 wherein said binder consists essentially of a polycarbonate, methylpentene copolymer, polyvinyl alcohol or a cellulose ester.

28. The article of manufacture as in claims 25, 26 or 27 where said dispersion is applied in patterns on said substrate.

29. The article of manufacture as in claims 25, 26 or 27 where said dispersion is applied in different coating thicknesses on said substrate.

30. The article of manufacture of claim 26 wherein said dispersion is a film from about 0.1 mils to about 10 mils thick.

31. The article of manufacture of claim 30 wherein said dispersion is operatively associated with a microwave transparent substrate.

32. The article of manufacture of claim 31 wherein said dispersion is a thermoplastic solid applied to a microwave transparent substrate by extrusion coating.

33. The article of manufacture of claim 31 wherein said dispersion is in the form of a thermoplastic film applied to a microwave transparent substrate by lamination.

34. The article of manufacture of claims 31 wherein said dispersion is applied to a microwave transparent substrate by coating or printing.

35. The article of manufacture as in claims 31, 32, 33 or 34 where said substrate is paper.

36. The article of manufacture as in claims 31, 32, 33 or 34 where said substrate is paperboard.

37. The article of manufacture as in claims 31, 32, 33 or 34 where said substrate is a thermoplastic 38. The article of manufacture as in claims 31, 32, 33 or 34 where said substrate is glass.

39. The article of manufacture as in claims 31, 32, 33 or 34 where said substrate is a ceramic.

40. The article of manufacture of claim 25 wherein said self-limiting temperature range is from about 300° F. to about 450° F.

41. The article of manufacture of claim 25 wherein said self-limiting temperature range is from about 350° F. to about 400° F.

42. A method of heating food comprising applying microwave energy to an article of manufacture where said article of manufacture comprises a self-limiting dispersion of a conductive material in a binder where said conductive material consists essentially of a carbon material having a structure selected to have a percolation threshold when dispersed in said binder at a concentration of from about 10 weight percent to about 45 weight percent in said binder, wherein said conductive material consists essentially of carbon black or graphite having a nitrogen absorption surface area of from about 5 to about 160 $m^2/g$, a DBP absorption number of from about 30 to about 150 cc/100 gm, and an average particle diameter of from about 15 to about 100 nm, said binder comprising a thermoplastic material selected to go through a first order phase transition or a second order phase transition at a temperature of from about 300° F. to about 480° F. when exposed to microwave radiation, said food being operatively associated with said article of manufacture, said microwave energy being sufficient to raise the temperature of said article of manufacture from about 300° F. to about 480° F.

43. A method of heating food according to claim 42 comprising applying microwave energy to said article of manufacture wherein said conductive material is carbon black, said food being operatively associated with said article of manufacture, said microwave energy being sufficient to raise the temperature of said article of manufacture from about 300° F. to about 480° F.

44. A method of heating food according to claim 42 comprising applying microwave energy to said article of manufacture, wherein said binder consists essentially of a polycarbonate, methylpentene copolymer, polyvinyl alcohol or a cellulose ester, said food being operatively associated with said article of manufacture, said microwave energy being sufficient to raise the temperature of said article of manufacture.

45. A method of heating food according to claim 42 comprising applying microwave energy to said article of manufacture, said article of manufacture having a self-limiting temperature range of from about 300° F. to about 450° F., said food being operatively associated with said article of manufacture, said microwave energy being sufficient to raise the temperature of said article of manufacture from about 300° F. to about 450° F.

46. A method of heating food according to claim 42 comprising applying microwave energy to said article of manufacture of said article of manufacture having a self-limiting temperature range of from about 350° F. to about 400° F. said food being operatively associated with said article of manufacture, said microwave energy being sufficient to raise the temperature of said article of manufacture from about 350° F. to about 400° F.

47. A method of heating food according to claim 42 comprising applying microwave energy to said article of manufacture wherein said dispersion is from about 0.1 mils to about 10 mils thick, said food being operatively associated with said article of manufacture, said microwave energy being sufficient to raise the temperature of said article of manufacture from about 300° F. to about 480° F.

48. A method of heating food according to claim 42 comprising applying microwave energy to said article of manufacture wherein said dispersion is operatively associated with a microwave transparent substrate, said food being operatively associated with said article of manufacture, said microwave energy being sufficient to raise the temperature of said article of manufacture from about 300° F. to about 480° F.

49. A method of heating food according to claim 42 comprising applying microwave energy to said article of manufacture wherein said dispersion is a solid applied to a microwave transparent substrate by extrusion coating, said food being operatively associated with said article of manufacture, said microwave energy being sufficient to raise the temperature of said article of manufacture from about 300° F. to about 480° F.

50. A method of heating food according to claim 42 comprising applying microwave energy to said article of manufacture wherein said dispersion is in the form of a film applied to a microwave transparent substrate by lamination said food being operatively associated with said article of manufacture, said microwave energy being sufficient to raise the temperature of said article of manufacture from about 300° F. to about 480° F.

51. A method of heating food according to claim 42 comprising applying microwave energy to said article of manufacture wherein said dispersion is applied to a microwave transparent substrate by coating or printing, said food being operatively associated with said article of manufacture, and said microwave energy being sufficient to raise the temperature of said article of manufacture from about 300° F. to about 480° F.

52. The carbon blacks as in claims 3, 5, 8, 9, 10, 25, 27, 31, 42, 44, or 54, comprising large particle size carbon blacks having a particle size from about 40 nm to about 90 nm blended with small particle size carbon blacks having a particle size from about 20 nm to about 35 nm, the ratio of said large particle size carbon blacks to said small particle size carbon blacks being from about 80/20 percent by weight to about 60/40 percent by weight.

* * * * *

UNITED STATES PATENT AND TRADEMARK OFFICE
CERTIFICATE OF CORRECTION

PATENT NO. : 5,410,135
DATED : April 25, 1995
INVENTOR(S) : Pollart et al.

It is certified that error appears in the above-identified patent and that said Letters Patent is hereby corrected as shown below:

Claim 16, column 19, line 39, before "extrusion"

insert --molding composition,--.

Claim 52, column 22, line 55, change "54" to --51--.

Signed and Sealed this

Eleventh Day of July, 1995

Attest:

BRUCE LEHMAN

Attesting Officer      Commissioner of Patents and Trademarks